United States Patent
Ohkawa

(12)
(10) Patent No.: US 6,412,968 B1
(45) Date of Patent: Jul. 2, 2002

(54) SURFACE LIGHT SOURCE DEVICE OF SIDE LIGHT TYPE, LIQUID CRYSTAL DISPLAY AND LIGHT GUIDE PLATE

(75) Inventor: Shingo Ohkawa, Koshigaya (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/127,723

(22) Filed: Aug. 3, 1998

(30) Foreign Application Priority Data

Aug. 11, 1997 (JP) ............................................. 9-228852
Jun. 15, 1998 (JP) ........................................... 10-166548

(51) Int. Cl.⁷ ............................................... F21V 8/00
(52) U.S. Cl. .......................... 362/26; 362/31; 362/330; 362/63
(58) Field of Search ............................ 362/31, 26, 330, 362/63; 349/65, 62

(56) References Cited

U.S. PATENT DOCUMENTS

| 5,769,522 A | * | 6/1998 | Kaneko et al. ................. 362/31 |
| 5,775,791 A | * | 7/1998 | Yoshikawa et al. ............ 362/31 |
| 5,921,651 A |   | 7/1999 | Ishikawa |
| 5,949,505 A | * | 9/1999 | Funamoto et al. ............. 349/65 |
| 5,951,138 A |   | 9/1999 | Ishikawa |
| 6,231,200 B1 | * | 5/2001 | Shinohara et al. ............ 362/31 |
| 6,334,690 B1 | * | 1/2002 | Okawa .......................... 362/31 |

FOREIGN PATENT DOCUMENTS

| CN | 230570 | 9/1994 |
| CN | 289802 | 11/1996 |

* cited by examiner

Primary Examiner—Sandra O'Shea
Assistant Examiner—Anabel Ton
(74) Attorney, Agent, or Firm—Staas & Halsey LLP

(57) ABSTRACT

A surface light source device of side light type 40 comprises a guide plate 42, a primary light source 3 comprising a wedge-shaped light source element 7 and a reflector 8, a reflection sheet 21, a prism sheet 41 and a light-scattering sheet 23. The guide plate 42 is wedge-shaped in cross-section and has a back surface 42B and an emission surface 42C. The emission surface 42C is a prism surface. A scattering pattern 24 is provided on the back surface 42B. The scattering pattern 24 comprises a great number of micro-dots, which are sufficiently small that they are hardly visible. Covering rate of the micro-dots is high near an incidence surface 42A, especially at the corners, thereby preventing brightness reduction in a region AR1. Irregularity of the dot arrangement avoids moaré streaks caused in relation to a color filter arrangement of a liquid crystal panel.

33 Claims, 19 Drawing Sheets

40: SURFACE LIGHT SOURCE DEVICE OF SIDE LIGHT TYPE

1: SURFACE LIGHT SOURCE DEVICE OF SIDE LIGHT TYPE

10: SURFACE LIGHT SOURCE DEVICE OF SIDE LIGHT TYPE

SURFACE LIGHT SOURCE DEVICE OF SIDE LIGHT TYPE, LIQUID CRYSTAL DISPLAY AND LIGHT GUIDE PLATE

BACKGROUND

1. Field of Invention

The present invention relates to a surface light source device of side light type applied to backlighting, a liquid crystal display and a light guide plate suitable for use therein.

2. Related Art

Conventionally, a surface light source device of side light type is, for instance, applied to a backlighting arrangement of a liquid crystal display. This arrangement is suitable for making the overall shape of the device thinner.

Generally, the surface light source device of side light type uses a wedge-shaped light source, such as a cold cathode tube, as a primary light source which is provided at the side of a light guide plate (plate-like guide body). Illumination light emitted from the primary light source is fed into the guide plate through a side end face thereof. Having been fed inside, the illuminating light propagates through the guide plate, whereby light is output from a major surface of the guide plate toward a liquid crystal display.

Known types of guide plate include a guide plate having a generally uniform thickness and a guide plate which decreases in thickness as distance from the primary light source increases. Generally, the latter emits illuminating light output more effectively than the former.

FIG. 20 is an exploded perspective view of a surface light source device of side light type using the latter type of guide plate. FIG. 21 is a cross-sectional view taken along the line A—A of FIG. 20. As shown in FIG. 20 and FIG. 21, a surface light source device 1 comprises a guide plate 2, a primary light source 3, which comprises a wedge-shaped light source element 7 and a reflector 8, a reflection sheet 4 and light control members consisting of prism sheets 5 and 6.

The guide plate 2 comprises a scattering guide body, which is wedge-shaped in cross-section, known as a scattering guide plate. The scattering guide body is made of a material having a uniform scattering function, and comprises a matrix of, for instance, PMMA (polymethylmethacrylate) and a great number of particles which are uniformly dispersed therein. The refractive index of these particles is different from that of the matrix.

The guide plate 2 has two major surfaces 2B and 2C. The major surface 2C is called an emission surface and outputs illuminating light. The other major surface is called a back surface.

The light source element 7 comprises, for instance, a cold cathode tube (fluorescent lamp), and a reflector 8, generally semicircular in cross-section, is provided to the rear of the light source element 7. Illumination light is supplied through the opening of the reflector 8 toward the side end surface of the guide plate 2. A sheet-like specular reflection member comprising metal foil or the like, or a sheet-like diffusive reflection member comprising white PET film or the like, is used as the reflection sheet 4.

After light L from the primary light source 3 has been led through the incidence surface 2A into the guide plate 2, inside the guide plate 2, the illuminating light L propagates toward the end while being repeatedly reflected between the emission surface 2C and the back surface 2B, along which the prism sheet 4 is arranged. During this time, the light receives the scattering action inside the guide plate 2. When a reflection sheet 4 having light-diffusion properties is used, dispersing action of this reflection sheet 4 also has effect. As a general tendency, the incidence angle to the emission surface 2C gradually decreases each time the light is reflected from the slope 2B. This increases components which are below the critical angle to the emission surface, facilitating emission from the emission surface. Consequently, insufficient emission of light in regions which are far from the primary light source 3 is prevented.

As a result of the above scattering action, the illuminating light emitted from the emission surface 2C has a great many propagation directions. However, the light is not completely scattered; the main direction of propagation inclines in the end direction (the opposite direction to the primary light source 3) with respect to the front direction. In other words, light emitted from the guide plate 2 has directivity. This property of the guide plate 2 is known as directional emission.

The prism sheets 5 and 6 are provided in order to correct this directivity. The prism sheets 5 and 6 comprise light-permeable sheet-like material such as, for instance, polycarbonate. In many cases, the prism surface of the prism sheet 5 is provided facing the scattering guide plate 2, while the prism surface of the prism sheet 6 is provided with its back facing the guide plate 2.

Each of the prism surfaces comprises a great number of micro-projections, triangular in cross-section, which run generally parallel to one direction. The inner side prism sheet 5 is provided so that its projections run generally parallel to the incidence surface 2A. The outer side prism sheet 6 is provided so that its projections run generally perpendicularly to the incidence surface 2A.

The slopes of these projections correct the main propagation direction of emitted light to the frontal direction of the emission surface 2C. Prism surfaces may provided on both faces; in other words, double-faced prism sheets may be used.

The above surface light source device of side light type generally emits light in the frontal direction more effectively than a device of the same type which uses a guide plate of practically uniform thickness.

However, the conventional device described above has a tendency whereby an undesirable region of low brightness is generated on the guide plate 2. This reduces the uniformity of the light output.

As shown for instance by reference mark AR1 in FIG. 20 and FIG. 22a, this low brightness region occurs in the vicinity of the incidence surface 2A.

Brightness distribution along the line B—B in FIG. 22a varies depending on density of particles dispersed inside the scattering guide plate 2. FIG. 22b illustrates two examples of brightness distribution (high density/low density). As can be understood from this graph, it is difficult to make brightness distribution flat, and thereby eliminate the low brightness region AR1, merely by adjusting the particle density.

As shown in FIG. 22a, the low brightness region AR1 tends to spread near the corners. The positions of the corners correspond to electrodes 7A and 7B of a wedge-shaped lamp 7. The low brightness region AR1 is liable to spread here since the electrodes 7A and 7B have weaker light supply power than the center 7C.

The following two solutions (1) and (2) to this problem have been proposed.

(1) According to a first proposed solution, as shown in the cross-section in FIG. 22c, the back surface 2B of the scattering guide plate 2 is shaped in a gentle curve, and particle density is adjusted so that brightness distribution becomes flat.

(2) According to another proposed solution, as shown in FIG. 23, groups of surface region elements 9, which have scattering a function; are provided in patterns of pitch P on the back surface 2B of the scattering guide plate 2. These are known as scattering patterns. The scattering patterns 9 increase the amount of illuminating light components below the critical angle to the emission surface 2C in the vicinity of the scattering patterns 9, consequently facilitating light emission.

The covering rate (occupancy rate) of the scattering patterns 9 increases near the edges. The scattering patterns 9 can be formed by local deposition of scattering ink, or by locally making the back surface 2B rough.

These proposed solutions are easily implemented when the back surface of the guide plate is basically a flat surface, but are difficult to implement when a great number of projections are provided on the back surface of the guide plate.

FIG. 24 is an exploded perspective view of a conventional surface light source device of side light type 10 which uses such a scattering guide plate 12. The surface light source device 10 is the same as the surface light source device 1 shown in FIG. 20, except that prism sheet 6 is not used and structure of the guide plate 12 is different. Therefore, explanation of like parts will not be repeated.

The guide plate 12 comprises the same scattering guide body as the guide plate 2 (see FIG. 20), but has a light control surface prism surface) provided on the back surface 12B of the guide plate 12. The light control surface has a great number of prism-like projections provided in rows. These projections are provided repeatedly and generally perpendicular to the incidence surface 12A. Slopes of the projections correct directivity of illuminating light emitted from the emission surface 12C. Correction is performed by shifting the preferential propagation direction closer to a frontal direction within a surface parallel to the incidence surface 12A.

The direction in which the rows of projections run is generally perpendicular to the prism sheet 5 (shown in partial enlargement at reference marks C and D). That is, the back surface (light control surface) 12B fulfils generally the same function of correcting directivity as the prism sheet 6. Furthermore, since one of the prism sheets is removed, not only can we expect a reduction of light loss, but also the overall structure is simplified.

However, as shown in the example of FIG. 24, in a structure using a scattering guide plate 12 which has such a light control surface, an undesirable low brightness region AR1 tends to be generated in the vicinity of the incidence surface 12A and particularly around the corners. Indeed, this tendency is even stronger than in structure (without a light control surface on the back surface of the guide plate) shown in FIG. 20. This is probably because the light control surface restricts light from spreading in the left and right directions as viewed from the incidence surface 12A.

In practice, application of the above proposed solutions (1) and (2) leads to difficulties. Design becomes extremely complex when attempting to curve the back surface 12B, which has a great number of projections, in compliance with first proposed solution, and in practice it is difficult to achieve uniform brightness distribution.

On the other hand, when attempting to realize uniform brightness distribution by providing scattering patterns in compliance with the second proposed solution (2), scattering patterns 9 of extremely large area are needed. As a result, the scattering pattern 9 becomes visible above the emission surface. Obviously, this causes a noticeable reduction in illumination output.

It is to be noted that, even when a light control surface is provided on the emission surface, a low brightness region of generally the same manner emerges. In this case, it is also difficult to obtain satisfactory results when the proposed solutions (1) and (2) are applied in practice.

OBJECT AND SUMMARY OF INVENTION

The present invention has been realized after consideration of the above background. Accordingly, it is an object of the present invention to improve a surface light source device of side light type wherein a scattering pattern can be applied without loss of illumination output quality, even when a light control surface is provided on a major surface (back surface or emission surface) of a guide plate.

It is another object of the present invention to provide a liquid crystal display in which such an improved surface light source device is applied as backlighting. It is yet another object of the present invention to provide a guide plate which is suitable for the above improvements.

The present invention provides a new guide plate. This guide plate is incorporated in a surface light source device of side light type, or in a liquid crystal display which is backlighted by the same.

The guide plate has an emission surface and a back surface as its major surfaces, light being fed in from an end surface, bending and finally being emitted from the emission surface. A light control surface, comprising a great number of projections running generally perpendicular to the incidence surface, is provided on the emission surface or the back surface, and a scattering pattern, comprising a great number of hardly visible micro-dots having a scattering function, is provided on the emission surface or the back surface.

In a typical case, the covering rate of the scattering pattern increases in accordance with the distance from the incidence surface, and, decreases as the distance from the corners increases. This tendency of covering rate corrects brightness distribution on the emission surface and prevents insufficient brightness, which is especially liable to occur near the corners.

Actual size of the micro-dots is not greater than 80 $\mu$m. More preferably, not greater than 50 $\mu$m. The micro-dots may comprise a locally rough surface provided on the emission surface or the back surface.

The micro-dot arrangement is random as long as it complies with the typical manner of arranging the micro-dots. The degree of randomness may also differ according to direction.

When the object to be illuminated is a color liquid crystal display, the degree of randomness should preferably differ according to direction. Consequently, moaré streaks are prevented. The micro-dots may be provided in a locally random arrangement so that they do not overlap with a specific color filter of the liquid crystal panel, which is the illuminated object.

Next, the present invention will be explained in detail with reference to the accompanying drawings.

EMBODIMENTS (1) First Embodiment

Figure 2:
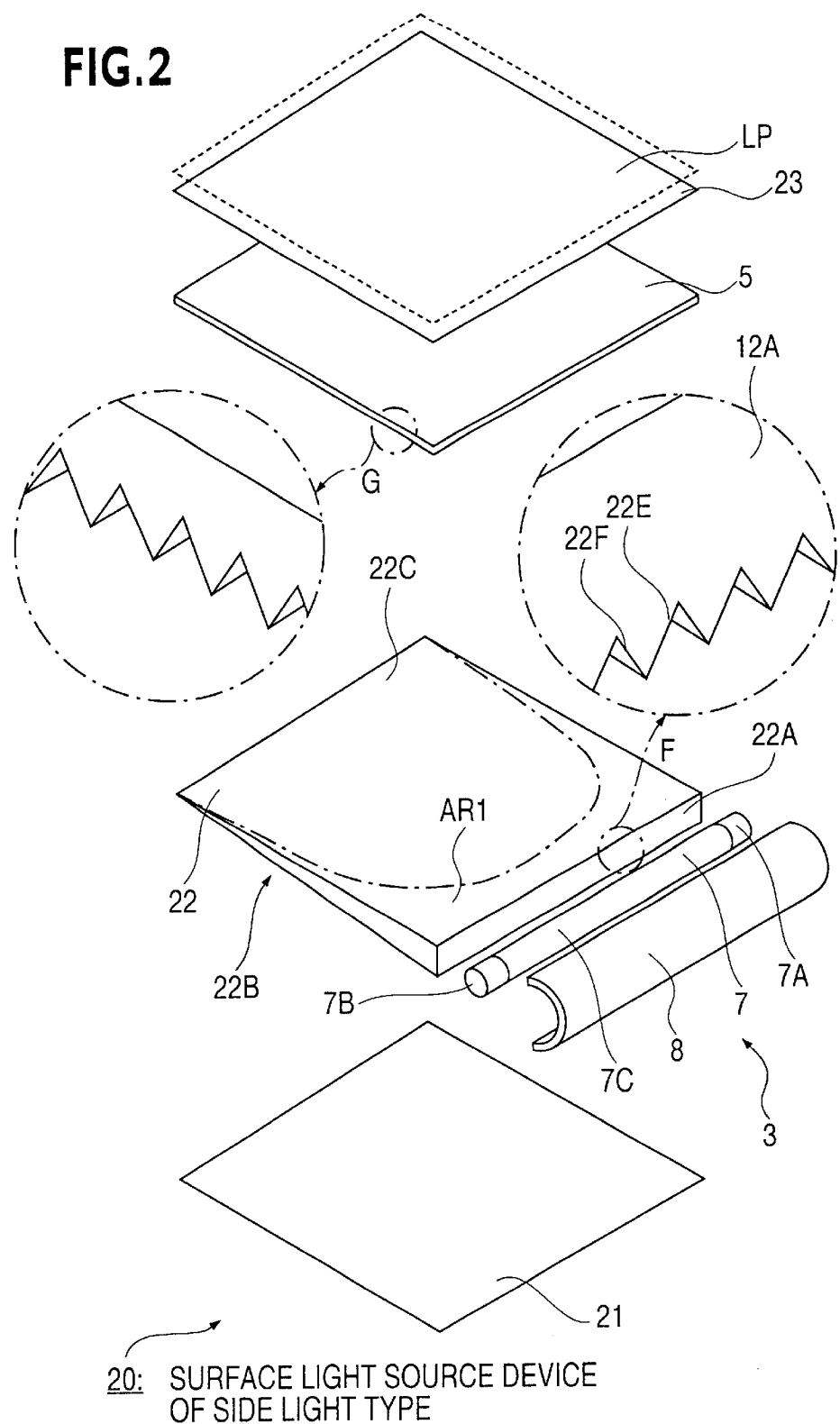
FIG. 2 is an exploded perspective view of first embodiment.
Figure 20:
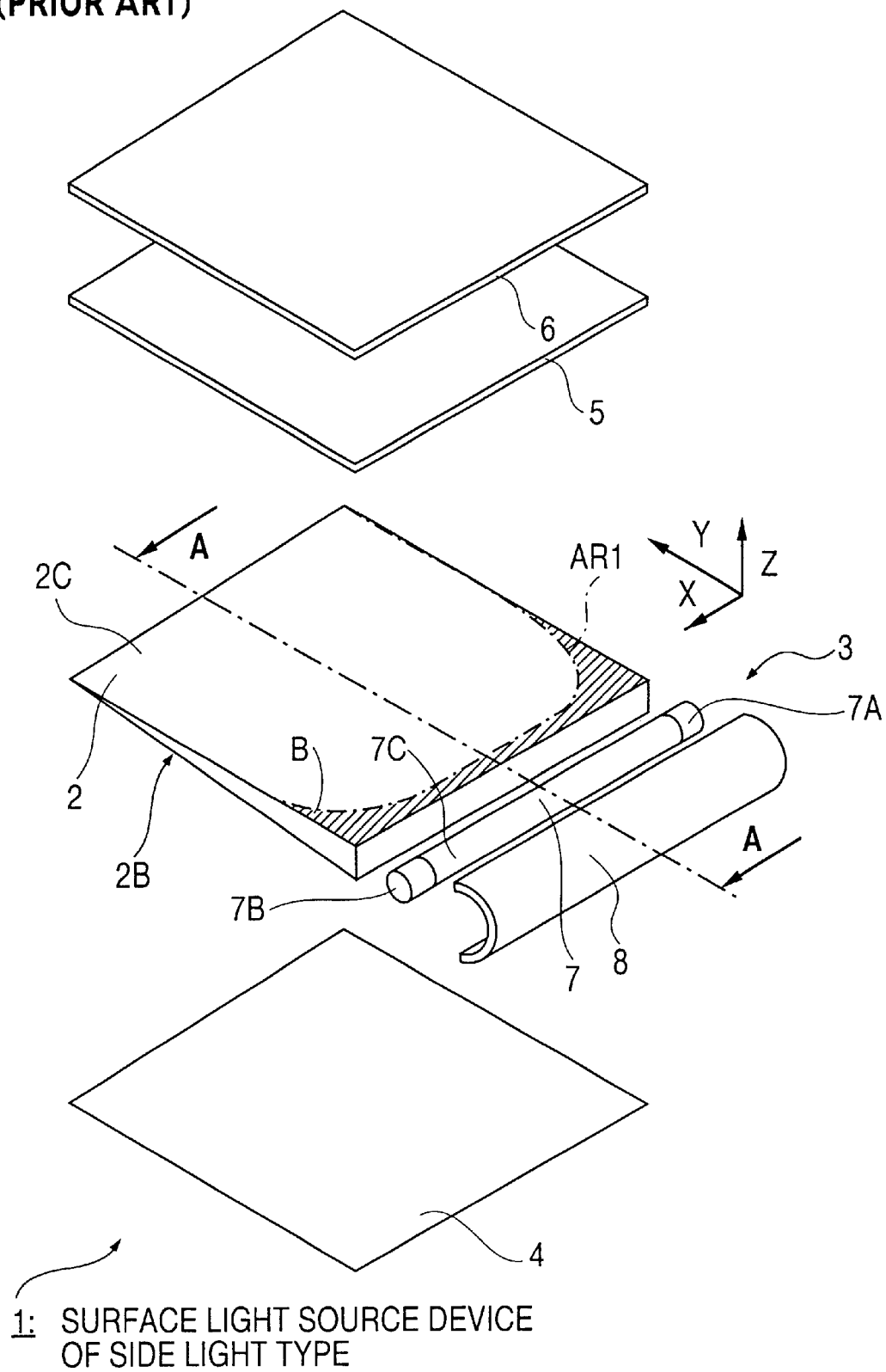
FIG. 20 is an exploded perspective view of a conventional surface light source device of side light type.
Figure 21:
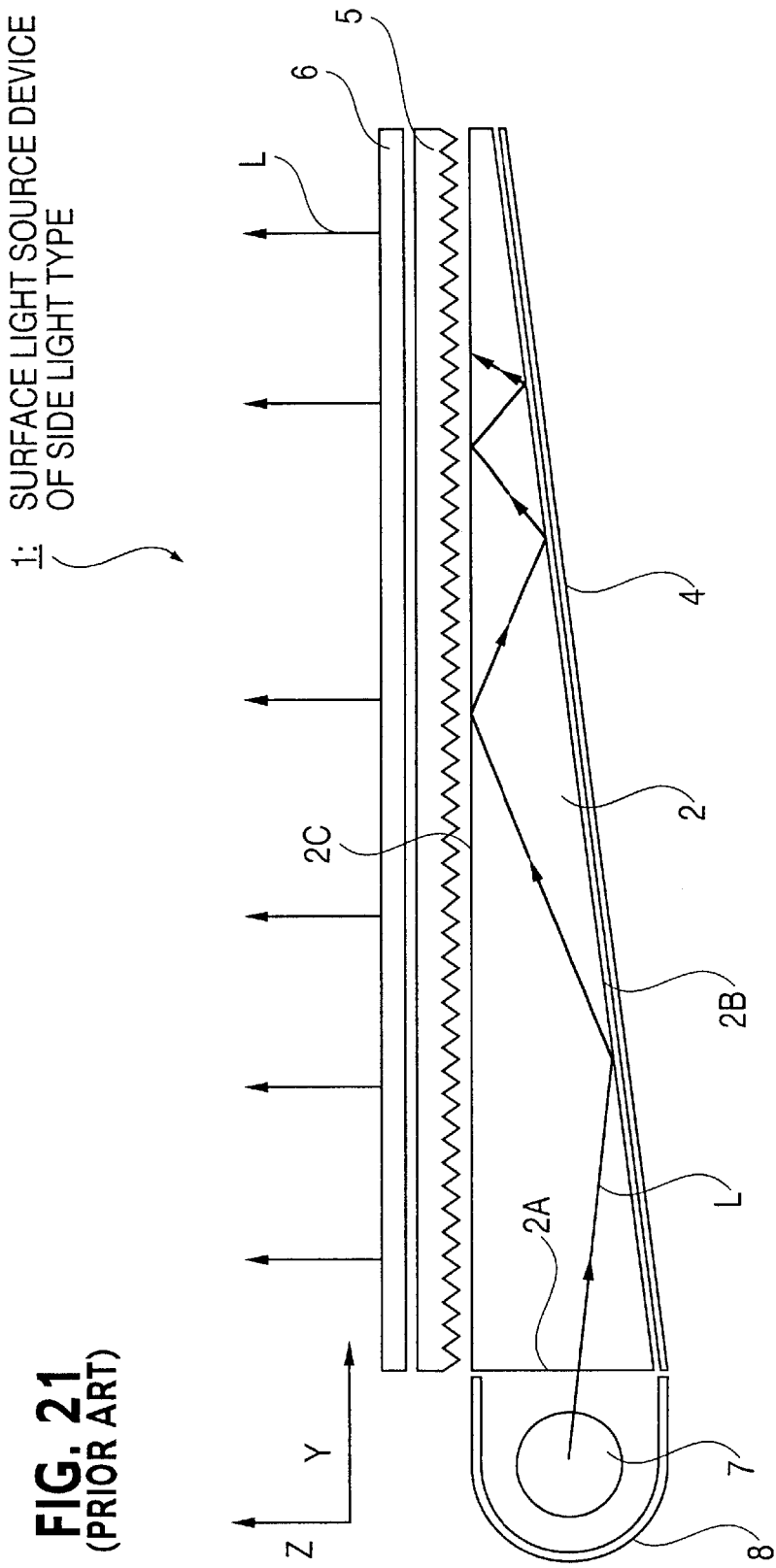
FIG. 21 is a cross-sectional view taken along line A—A of FIG. 20.
Figure 22A:
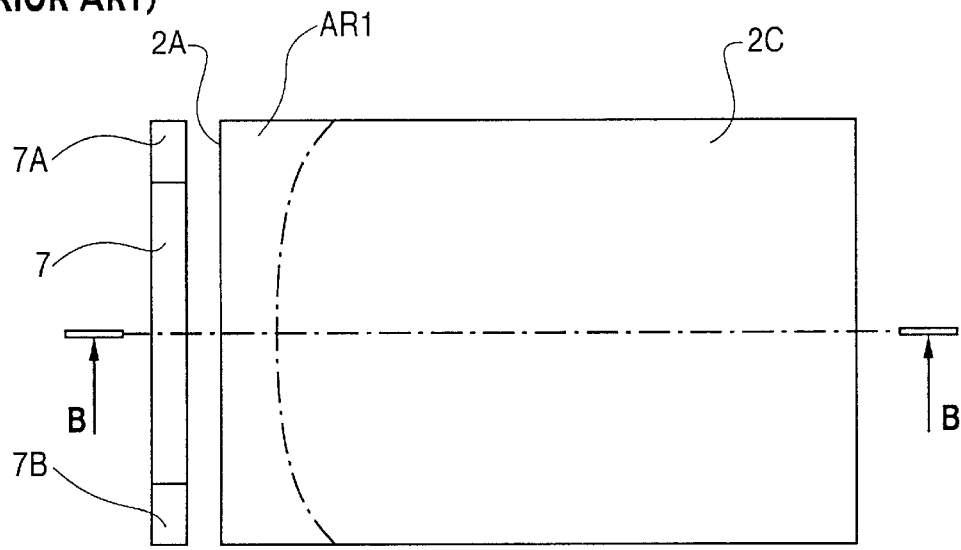
FIG. 22a, FIG. 22b and FIG. 22c are diagrams to explain brightness distribution in the surface light source device shown in FIG. 20.
Figure 22B:
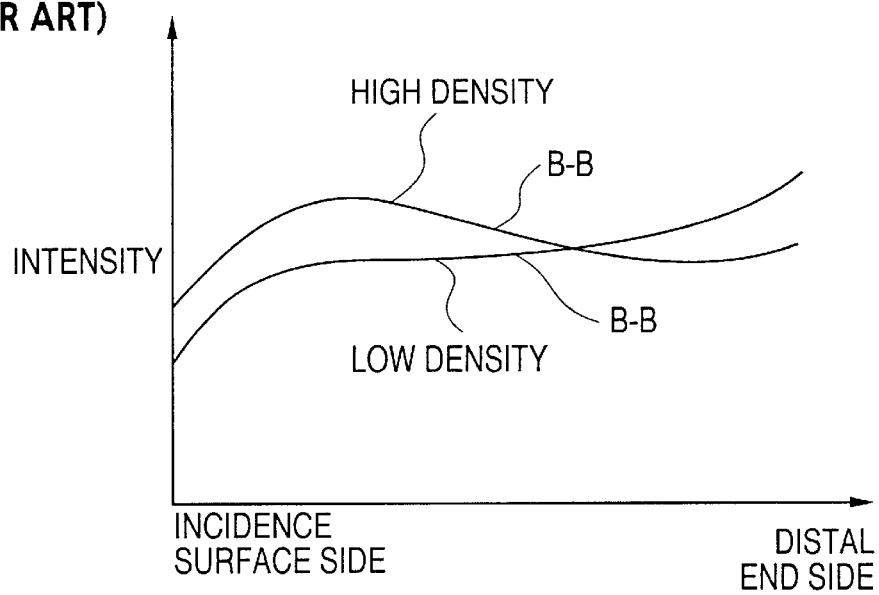
Figure 22C:
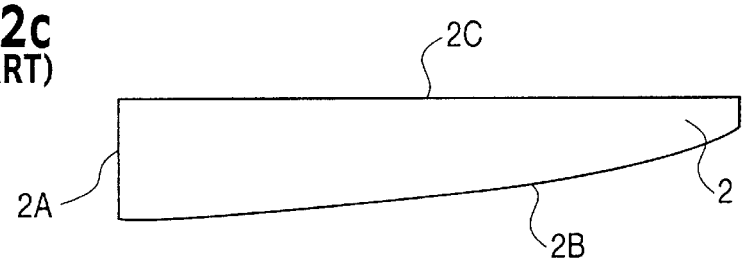
Figure 23:
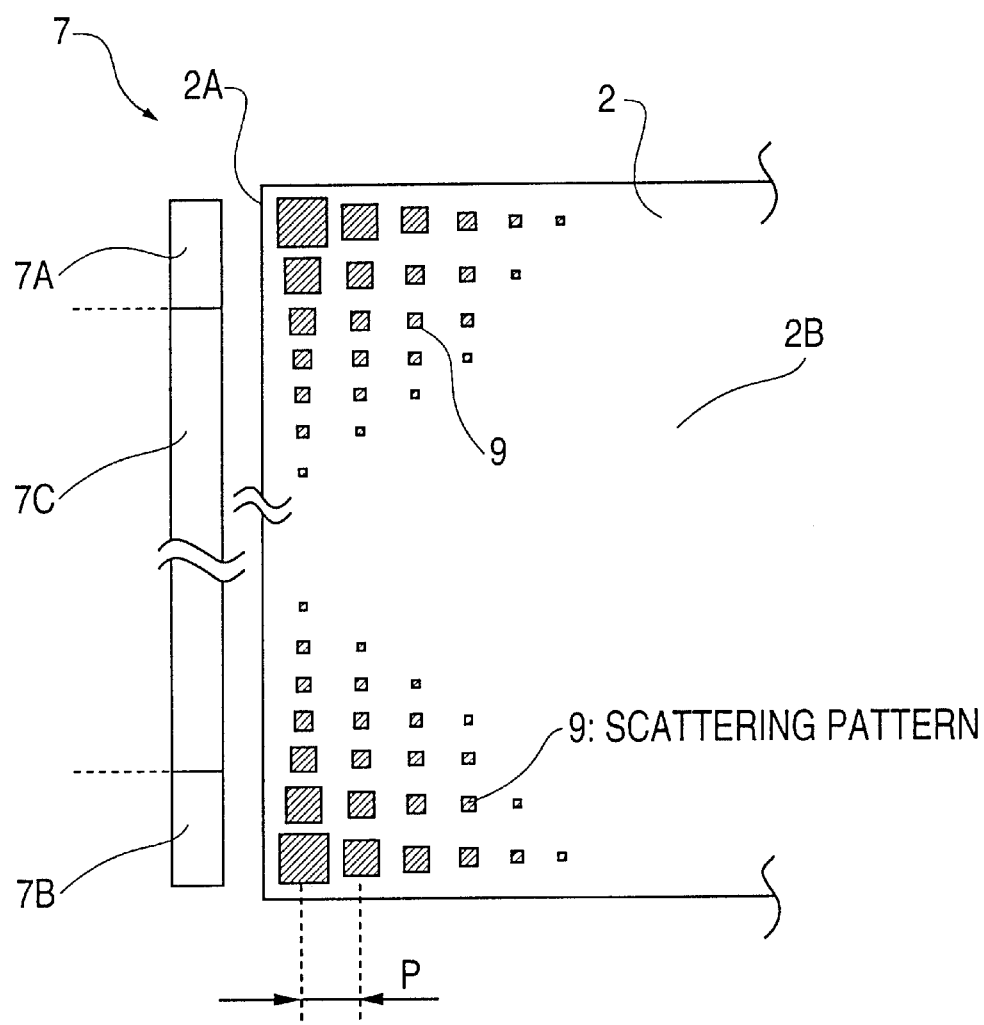
FIG. 23 is a plan view of a back surface of the scattering guide plate used in the surface light source device shown in FIG. 20.
Figure 24:
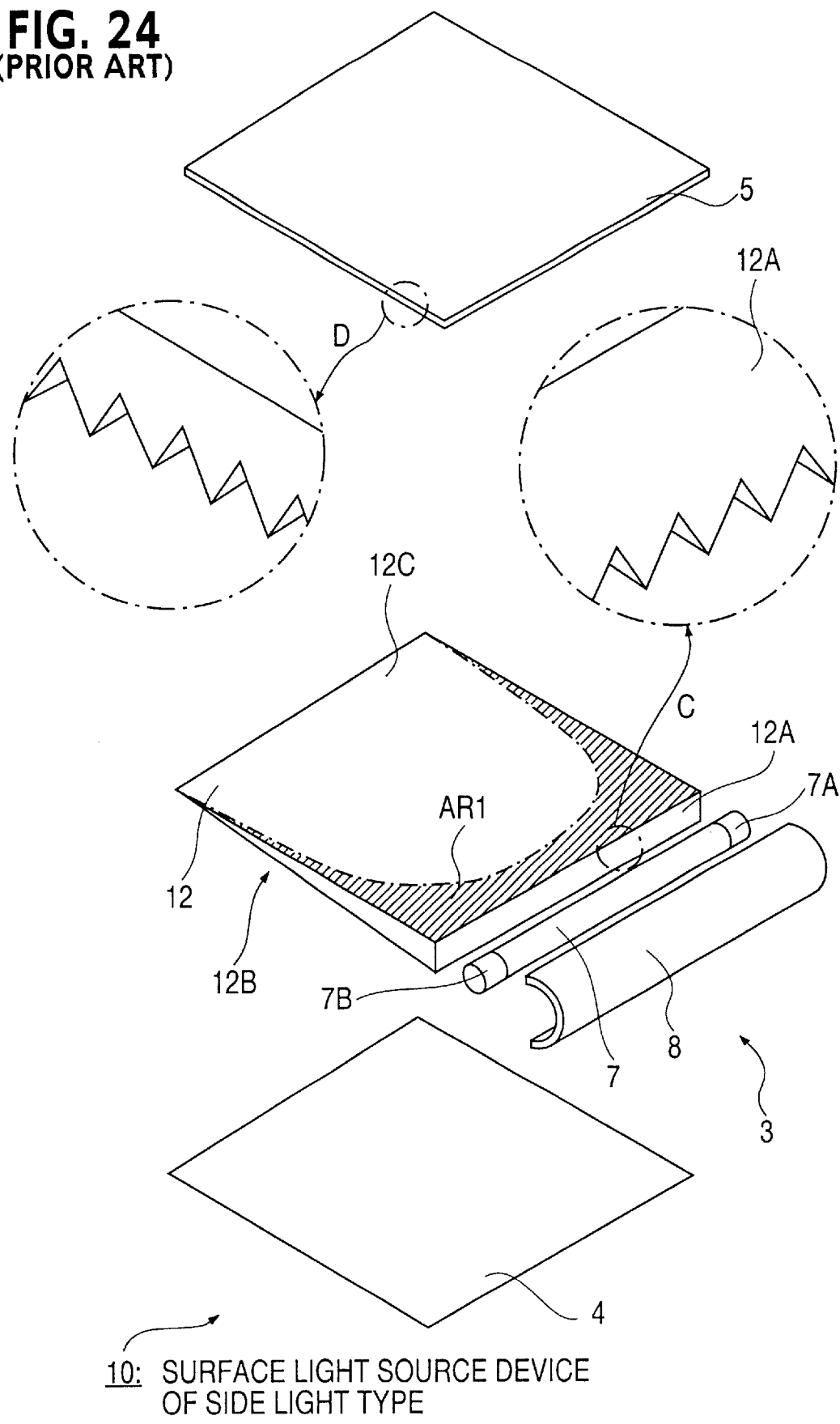
FIG. 24 is an exploded perspective vie of a conventional surface light source device of side light type using a scattering guide plate to which a prism surface is provided.

FIG. 2 illustrates a first embodiment in a similar manner to FIG. 24. The surface light source device of side light type 20 is characterized in that a new guide plate 22 is used. The device shown in FIG. 2 differs from that of FIG. 20 in respect of the addition of a light-scattering sheet 23. A constitution of the liquid crystal display is given by further providing a liquid crystal display panel LP, indicated by a broken line. The other elements are the same as shown in FIG. 20. Therefore, the following explanation will concentrate on the characteristics of the present invention, with repeated explanation omitted.

The surface light source device 20 comprises a guide plate 22, a primary light source 3, comprising a wedge-shaped light source element 7 and a reflector 8, a reflection sheet 21, a prism sheet 5 as a light control member, and a light-scattering sheet 23.

The guide plate 22 comprises a scattering guide body which is wedge-shaped in cross-section. The matrix comprises, for instance, polymethyl-methacrylate (PMMA) and a great number of light-permeable particles are uniformly dispersed therein. The particles have a different refractive index to the matrix.

The guide plate 22 comprises major surfaces 22B and 22C. The major surface 22C provides an emission surface from which illuminating light is output. The other major surface 22B provides a back surface. As described later, a scattering pattern is provided on the emission surface 22C.

The light source element 7 comprises, for instance, a cold cathode tube (fluorescent lamp), and a reflector 8, semicircular in cross-section, is provided to the back surface of the cold cathode tube. Illumination light is supplied through the opening of the reflector 8 toward the side end surface of the guide plate 22. A sheet-like specular reflection member comprising metal foil or the like, or a sheet-like diffussive reflection member comprising white PET film or the like, is used as the reflection sheet 21.

A light control surface (prism surface) is provided on the back surface 22B (shown partially in enlargement at reference mark F). This light control surface has rows of a great number of prism-like micro-projections. Each projection has a pair of slopes 22E and 22F extending at right angles to the incidence surface 22A. In the present embodiment, the pair of slopes 22E and 22F is directly connected, forming a triangle when viewed in cross-section. The angle (top angle) between the slopes 22E and 22F is, for instance, generally 100 degrees. A more practical angle range is 50~130 degrees.

The prism sheet 5 comprises light-permeable sheet-like material such as, for instance, polycarbonate. In many cases, the prism sheet 5 is provided facing the scattering guide plate 22 (shown in partial enlargement at reference mark G). The micro-projections run generally parallel to the incidence surface 22A. The top angle of the micro-projections of the prism sheet 5 is determined according to design, a practical range being, for instance, 30~70 degrees. The projections may be symmetrical or asymmetrical in accordance with need.

The light-scattering sheet 23, which comprises a sheet-like member exhibiting weak scattering, scatters light emitted from the prism sheet 5, thereby reducing directivity of the emitted light.

Figure 1:
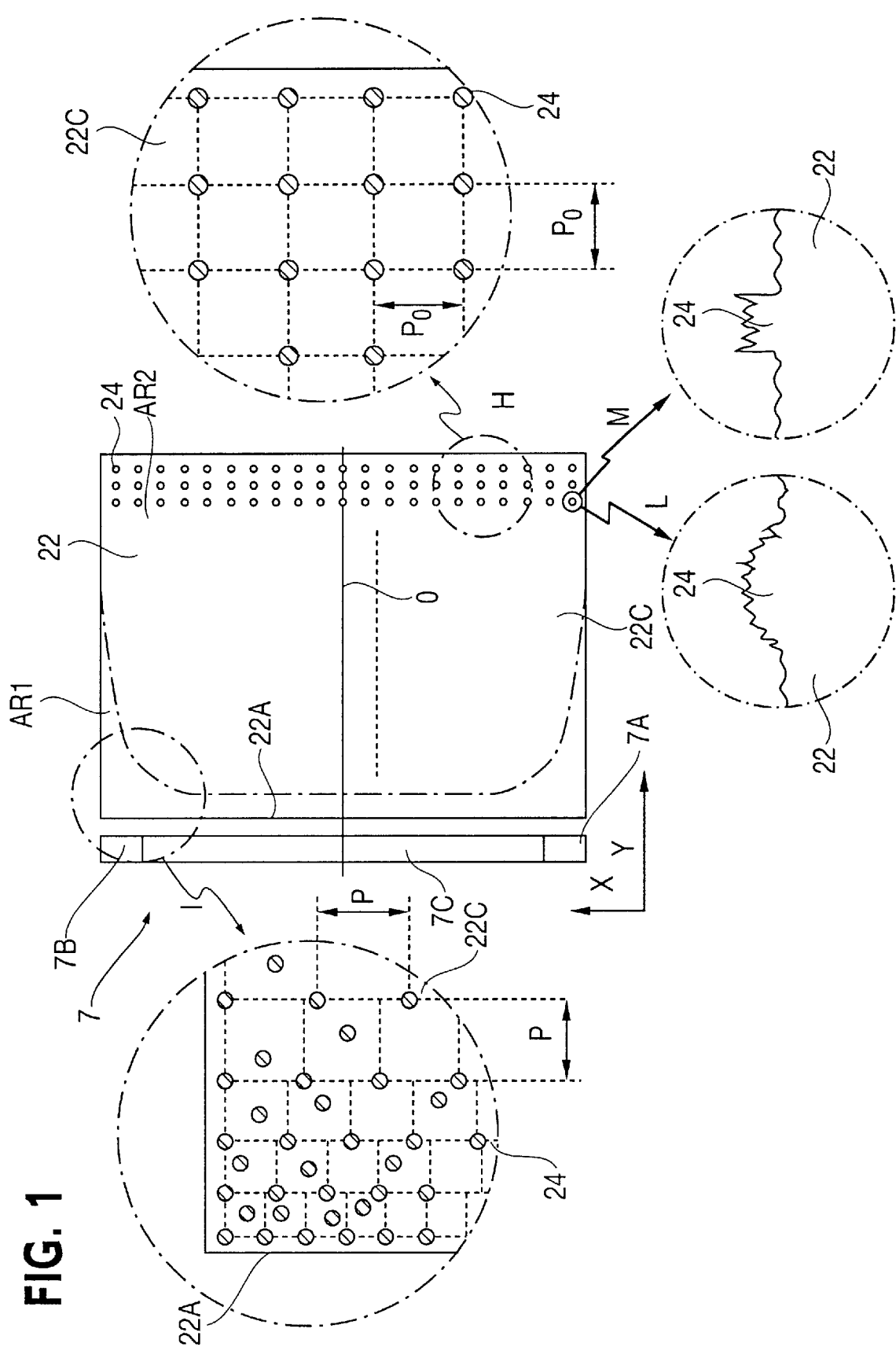
FIG. 1 is a plan view of an emission surface of a scattering guide plate used in first embodiment of the present invention.

Next, the scattering pattern, which is characteristic of the present invention, will be explained more specifically. As shown in FIG. 1, a scattering pattern 24 is provided on the emission surface 22C of the scattering guide plate 22.

The scattering pattern 24 comprises a cluster of micro-dots with scattering power. This scattering power is for instance produced by making the emission surface 22C locally rough. In FIG. 1, the dots are depicted as circular. In this specification, reference mark 24 is also used to indicate individual dots.

Etching on a metal mold for manufacturing the scattering guide plate 22 may be performed to form a great number of micro-dots by making the emission surface 22C locally rough. As shown by enlarged cross-sections at arrows L and M, three-dimensionally, individual dots may be like domes or columns or the like.

The dots are micro-sized to an extent that they are hardly visible when viewed from above the emission surface 22C. Dot radius is, for instance, generally 50 μm, and generally should preferably be below 80 μm. 50 μm is acceptable.

In FIG. 1 and FIG. 2, reference mark AR1 represents the low brightness region AR1 shown in FIG. 24. The scattering pattern 24 provided within the region AR1 has increased dot density (number of dots per area unit) and cover rate, thereby preventing reduction of brightness within the region AR1.

The region AR1 depicted here forms a generally U-shaped belt near the incidence surface 22A. The belt is thick at the corners, corresponding to the electrodes 7A and 7B of the fluorescent lamp 7, and thin at the center portion between the corners. Furthermore, the belt becomes gradually thinner along the side edges as running away from the corners.

Figure 3:
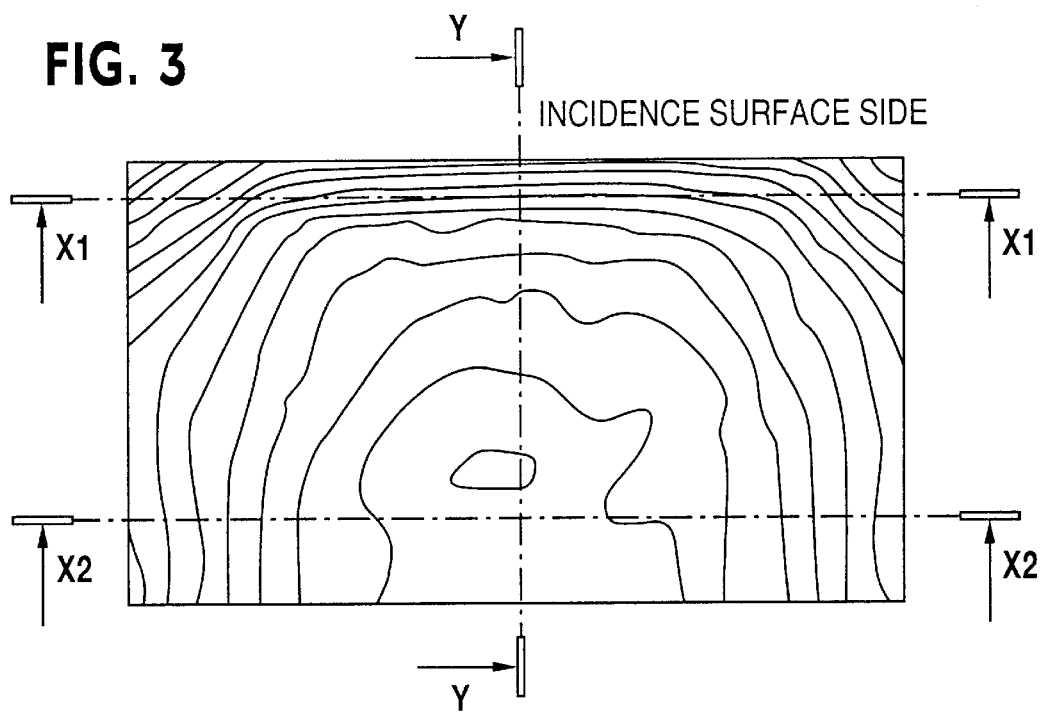
FIG. 3 is a diagram showing brightness distribution when no scattering pattern is provided.

In order to determine actual design of the scattering pattern 24, two-dimensional brightness distribution on the emission surface 22C of the scattering guide plate 22 before the scattering pattern is formed may be measured. FIG. 3 shows an example of such a measurement result, depicting iso-brightness of pitch 200 cd/mm².

Figure 4:
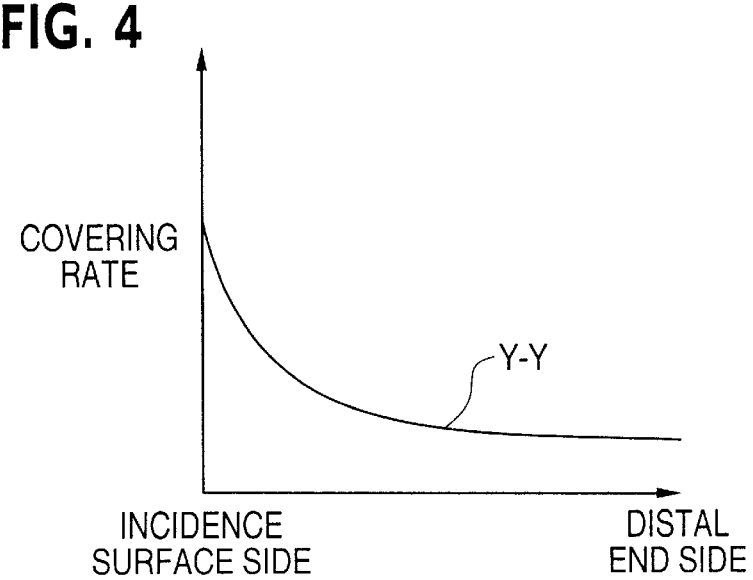
FIG. 4 is a graph showing an example of cover rate charge on the line Y—Y of FIG. 3.

The covering rate of the scattering pattern 24 is set so that uniform brightness distribution is first obtained on the center line Y—Y, which is perpendicular to the incidence surface 22A. FIG. 4 shows an example of a shift in covering rate along the center line Y—Y.

In the present embodiment, the dot arrangement combines a square grid-like arrangement with a random arrangement. Firstly, as shown in FIG. 3, the pitch P (length of the square) of the grid-like arrangement in the bright area is set to an appropriate value (reference value $P_0$). Then, pitch shift along the center line Y—Y is set in accordance with the shift of FIG. 4. The pitch P may be inversely proportional to the square of the covering rate.

Figure 5:
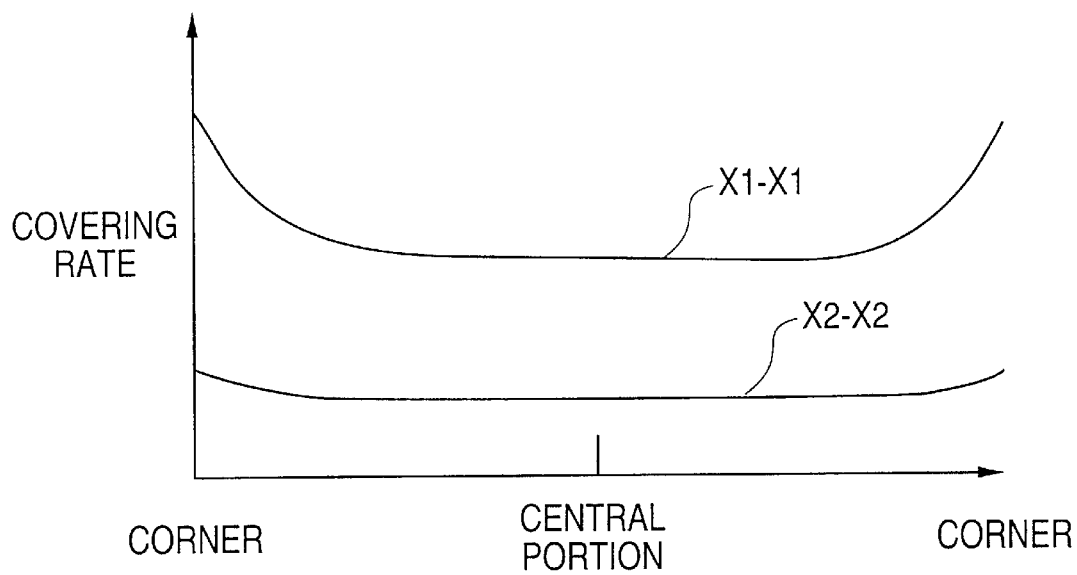
FIG. 5 is a graph showing cover rate on line X1—X1 and line X2—X2 of FIG. 3.

The shift of pitch P in the remaining areas is determined under considering brightness distribution in FIG. 3. For instance, covering rate shift (inversely proportional to the square of the pitch P) along imaginary lines X1—X1 and X2—X2, parallel to the incidence surface 22A, is set to match the example shown in FIG. 5. In this way, square grids for the whole of the emission surface 22C are determined. One dot is allocated at one top point of each square.

As required, a random arrangement is put in addition to the square grid-like arrangement. In the present embodiment, at the corners, dots (scattering pattern 24) are randomly arranged at points other than the top points of the squares (grid points).

As a result, the scattering pattern 24 shown in FIG. 1 is obtained. As shown in the partial enlargement at reference mark H, pitch $P=P_0$ in the portions which are far from the incidence surface 22A. On the other hand, as shown in the partial enlargement at reference mark I, pitch P is not greater than $P_0$ in the portions which are close to the incidence surface 22A, and especially in the corners; moreover, dots (scattering pattern 24) are provided at points other than grid points. As a consequence, reduction of brightness, which tends to be noticeable at the corners, is prevented.

In other words, by providing a scattering pattern 24 in a grid-like arrangement, and, in addition, providing a further scattering pattern 24 at random as required, brightness distribution of the whole emission surface 22C can be made generally uniform. The additional random arrangement is not generally needed for areas other than the region AR1, but it can be used if necessary.

Figure 6:
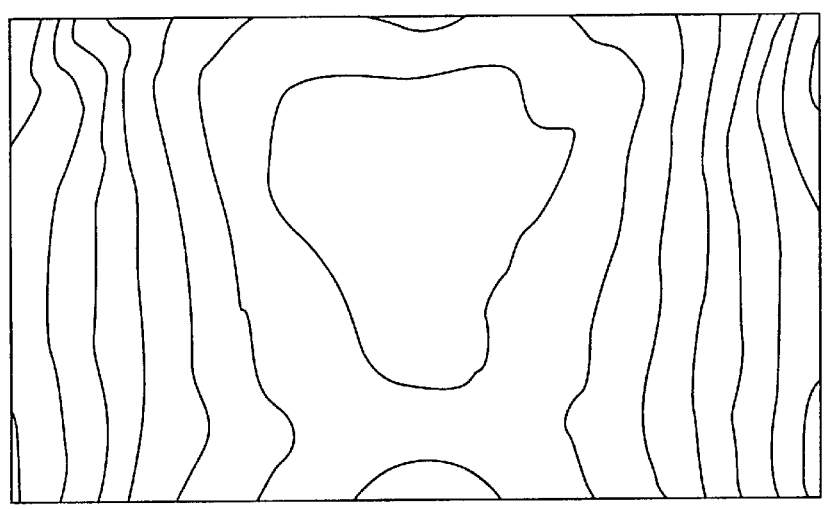
FIG. 6 is a plan view of brightness distribution of the surface light source device of FIG. 1.

Brightness distribution in a surface light source device using a scattering guide plate 22 having the scattering pattern 24 of FIG. 1 was measured under identical conditions to FIG. 3. FIG. 6 shows the results obtained, depicting iso-brightness having pitch of 200 cd/mm². It can be seen that, by comparison with FIG. 3, reduction of brightness in the corners has been restricted and brightness uniformity over the whole of the emission surface 22C has been improved.

Behaviour of light in the present embodiment will next be summarized.

Illumination light passes through the incidence surface 22A and is fed into the guide plate 22, wherein the illuminating light propagates toward the end while being repeatedly reflected between the back surface 22B and the emission surface 22C. During this time, the illuminating light receives the scattering action inside the guide plate 22. If the reflection sheet 21 is light-dispersive, this light-dispersion action also takes effect.

Here, moreover, it is important that the scattering action of the scattering pattern 24 is active. That is, the scattering power, which has been strengthened within the region AR1, and especially at the corners, facilitates emission from the region AR1 in accordance with covering rate of the dots. As a result, brightness reduction, which could easily occur within the region AR1, and especially at the corners (see the diagonally shaded portion AR1 in FIG. 24), is restricted or eliminated.

Incidence angle with the emission surface 22C gradually decreases each time the illuminating light is reflected off the back slope 22B. As a result, the incidence angle gradually decreases, facilitating emission from the emission surface 22C and facilitating emission from regions which are far from the primary light source 3. The reflection sheet 21 returns light leaked from the back surface (light control surface) 22B into the guide plate 22, preventing energy loss.

On the other hand, the light control surface gathers light toward the frontal direction within a surface parallel to the incidence surface 22A. That is, the light control surface of the back surface 22B of the guide plate 22 corrects directivity of illuminating light emitted from the emission surface 22C. Correction is performed by shifting the preferential propagation direction closer to the frontal direction within a surface parallel to the incidence surface 22A. As already explained, the main propagation direction (preferential propagation direction) of illuminating light emitted from the emission surface 22C inclines in the end direction (the opposite direction to the primary light source 3) with respect to the front direction.

The prism sheet 5 corrects such directivity and deflects the preferential propagation direction to the frontal direction. The light-scattering sheet 23 eases directivity of light output from the prism sheet 5, and in addition, the light-diffusion action of the light-scattering sheet 23 makes the scattering pattern 24 harder to see. The light output from the light-scattering sheet 23 is used as backlighting for the liquid crystal panel PL.

Next, other advantages of the present embodiment will be explained.

1. Preventing Bright Lines caused by Illumination of Edges

Figure 7:
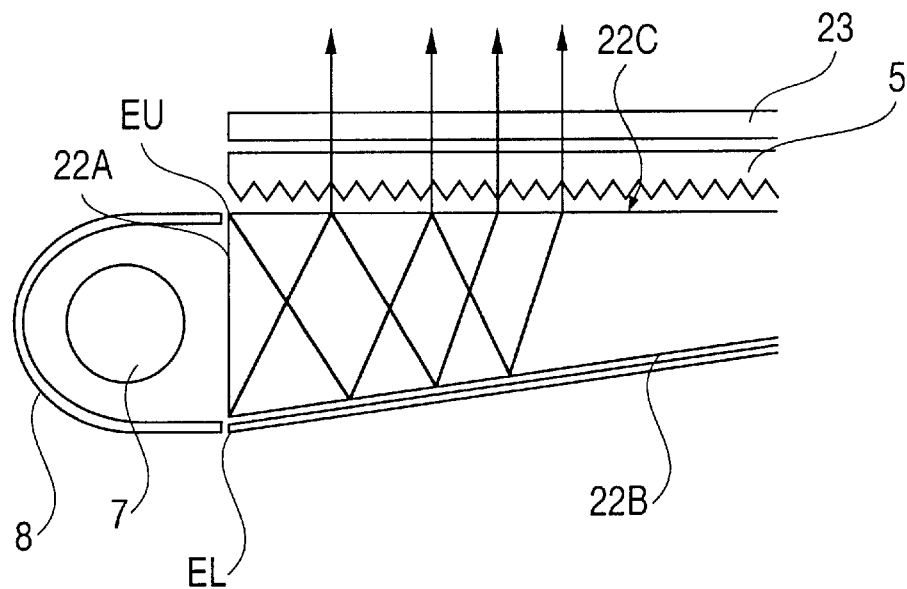
FIG. 7 is a cross-sectional view to explain a mechanism for generating bright lines.

In the surface light source device of side light type, there is a possibility of bright lines occurring on the emission surface 22C in the vicinity of the incidence surface 22A. As shown in FIG. 7, upper and lower edges EU and EL of the incidence surface 22A tend to be brightly illuminated. Light illuminating onto the edges is repeatedly reflected between the back surface 22B and the emission surface 22C of the guide plate 22, and some of this light is locally emitted. Consequently, one or more bright lines are created near the incidence surface 22A.

Furthermore, there are cases when another element, in addition to the prism sheet 5, is secured near the incidence surface 22A by a securing member, such as double-sided-adhesive tape. The ends of such a securing member tend to be brightly illuminated. As with edge illumination, this causes bright lines.

In the present embodiment, the scattering pattern 24 is provided on the emission surface 22C, and at high density near the incidence surface 22A. Therefore, the scattering pattern 24 scatters the light path which causes the bright lines, preventing strong emission from regions of narrow lines. As a result, the bright lines are obscured and become difficult to see.

2. Preventing Prism Sheet Adhesion

Figure 8:
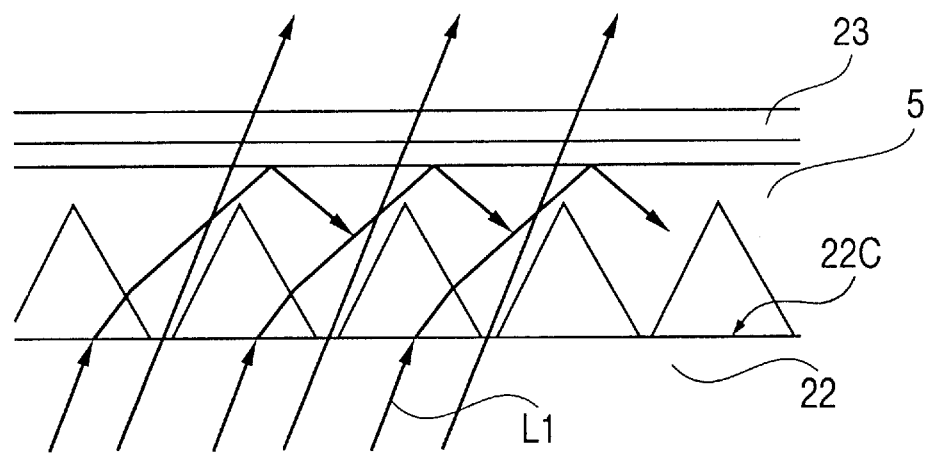
FIG. 8 is a cross-sectional view to explain brightness discrepancies caused by attachment of a prism sheet.

As shown in FIG. 8, in a case where the emission surface 22C comprises a mirror surface (with no scattering pattern), the tops of the projections on the prism sheet 5 stick to the emission surface 22C of the scattering guide plate 22. This creates a light path which is different from other regions. That is, a phenomenon occurs wherein light passing into the prism sheet 5 through these stick positions is directly emitted toward the light-scattering sheet 23.

Such a light path only occurs at the stick positions. Therefore, the strength of light output from the prism sheet 5 changes locally in correspondence with the stick positions. This is observed as undesirable brightness discrepancies on the light-scattering sheet 23 or on the liquid crystal panel PL (see FIG. 2).

Figure 9:
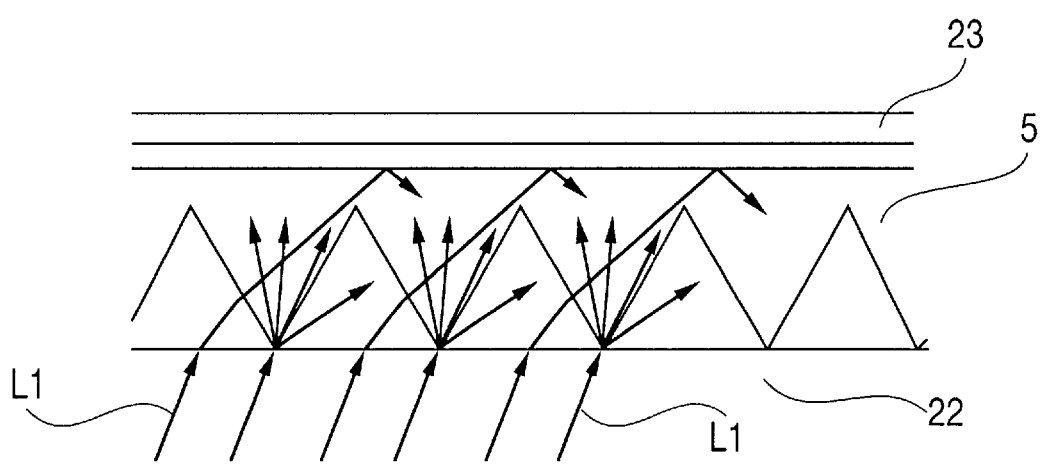
FIG. 9 is a cross-sectional view to explain prevention of brightness discrepancies.

As shown in FIG. 9, since the present embodiment provides a scattering pattern 24 on the emission surface 22C, the tops of the projections cannot easily stick to the emission surface 22C of the scattering guide plate 22. Consequently, brightness discrepancy caused by sticking is prevented.

3. Preventing Moarés and Roughness in Appearance

In the present embodiment, the dot arrangement of the scattering pattern 24 has high regularity in the direction which is orthogonal to the incidence surface 22A, but not in the direction parallel to the incidence surface 22A.

If a dot arrangement having regularity in both the orthogonal and parallel directions is provided, there is a tendency of moarés arising in connection with regularity of other members (for instance, repetition of the projections of the prism sheet 5). When the dots are irregular in both directions, roughness in appearance can be observed on the emission surface 22C.

To solve this, in the present embodiment, the dot arrangement is regular in one direction and irregular in the other direction, thereby preventing moaré streaks and roughness.

(2) Second Embodiment

Figure 10:
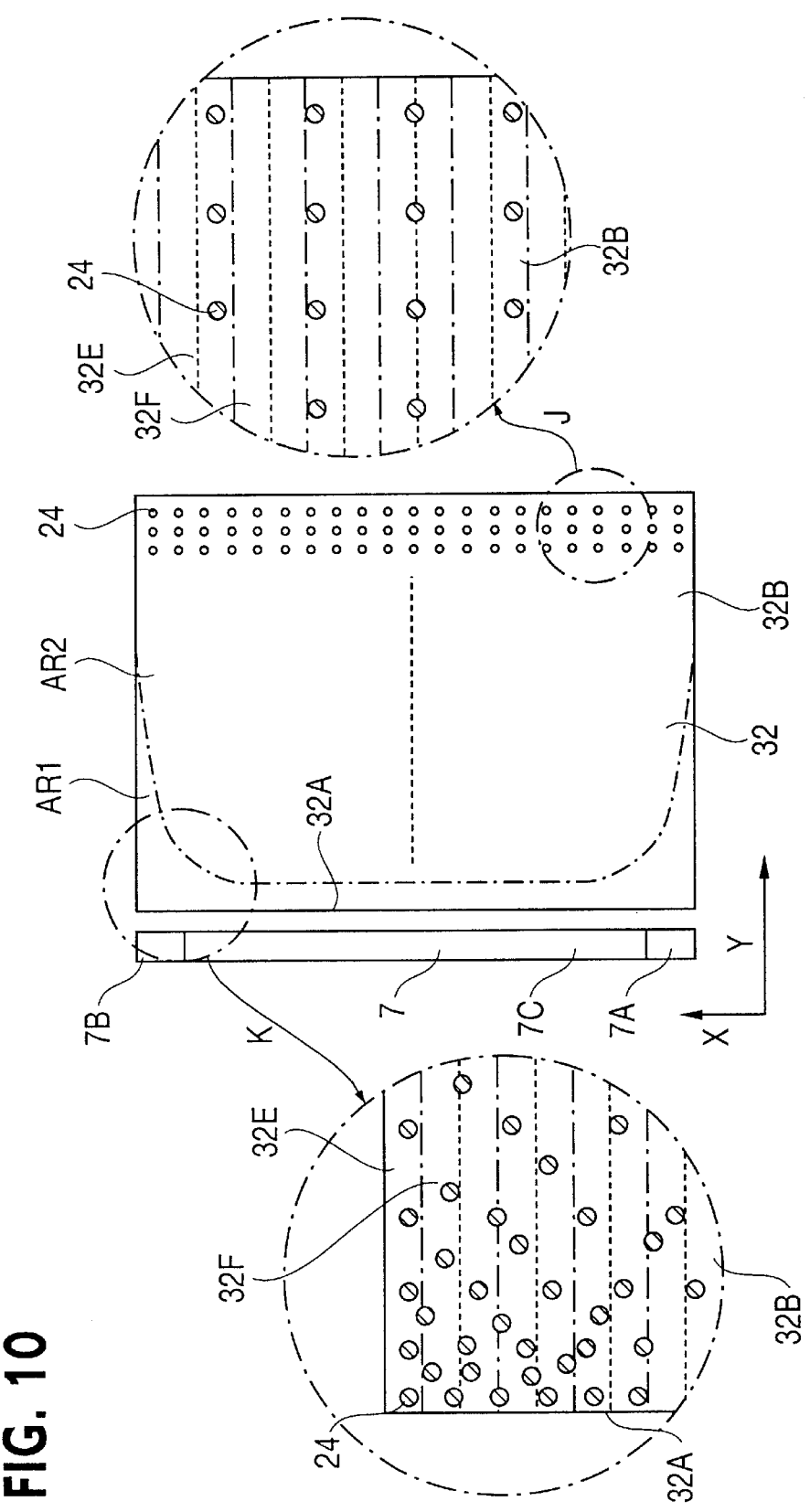
FIG. 10 is a plan view of a back surface of a scattering guide plate used in the second embodiment.

FIG. 10 illustrates, in the same manner as FIG. 1, a scattering pattern arrangement in a scattering pattern guide plate used in a surface light source device of side light type according to a second embodiment. With the exception of the scattering pattern arrangement, structure and functions of this embodiment are identical to first embodiment. Therefore, repetition will be omitted and the following explanation will concentrate on the scattering pattern.

Scattering guide plate 32 is provided with a uniform rough emission surface, which prevents adhesion of the prism sheet 5. Further, the back surface 32B has a great number of projections which run generally perpendicular to the incidence surface 32A. Each projection has a pair of slopes 32E and 32F, and is therefore triangular in cross-section.

As in the first embodiment, the back surface 32B provides a light control surface (prism surface) which gathers illuminating light toward the frontal direction within a surface parallel the incidence surface 32A. In FIG. 10, the lines of crests and troughs of the slopes 32E and 32F are represented by broken lines and alternate long and short dash lines respectively.

The scattering guide plate 32 has scattering patterns 24 provided on the back surface 32B in a similar manner to the first embodiment. As shown by the partial enlargement at reference mark J in FIG. 10, the scattering patterns 24, in a square grid arrangement of a predetermined pitch, are provided in the portion which is far from the incidence surface 32A. On the other hand, as shown by the partial enlargement at reference mark K, pitch is lower near the incidence surface 32A and especially in the corners. Furthermore, dots (scattering patterns 24) are provided at positions other than the grid points. Consequently, brightness reduction, which would be most noticeable in the corners, is prevented.

(3) Third Embodiment

Figure 11:
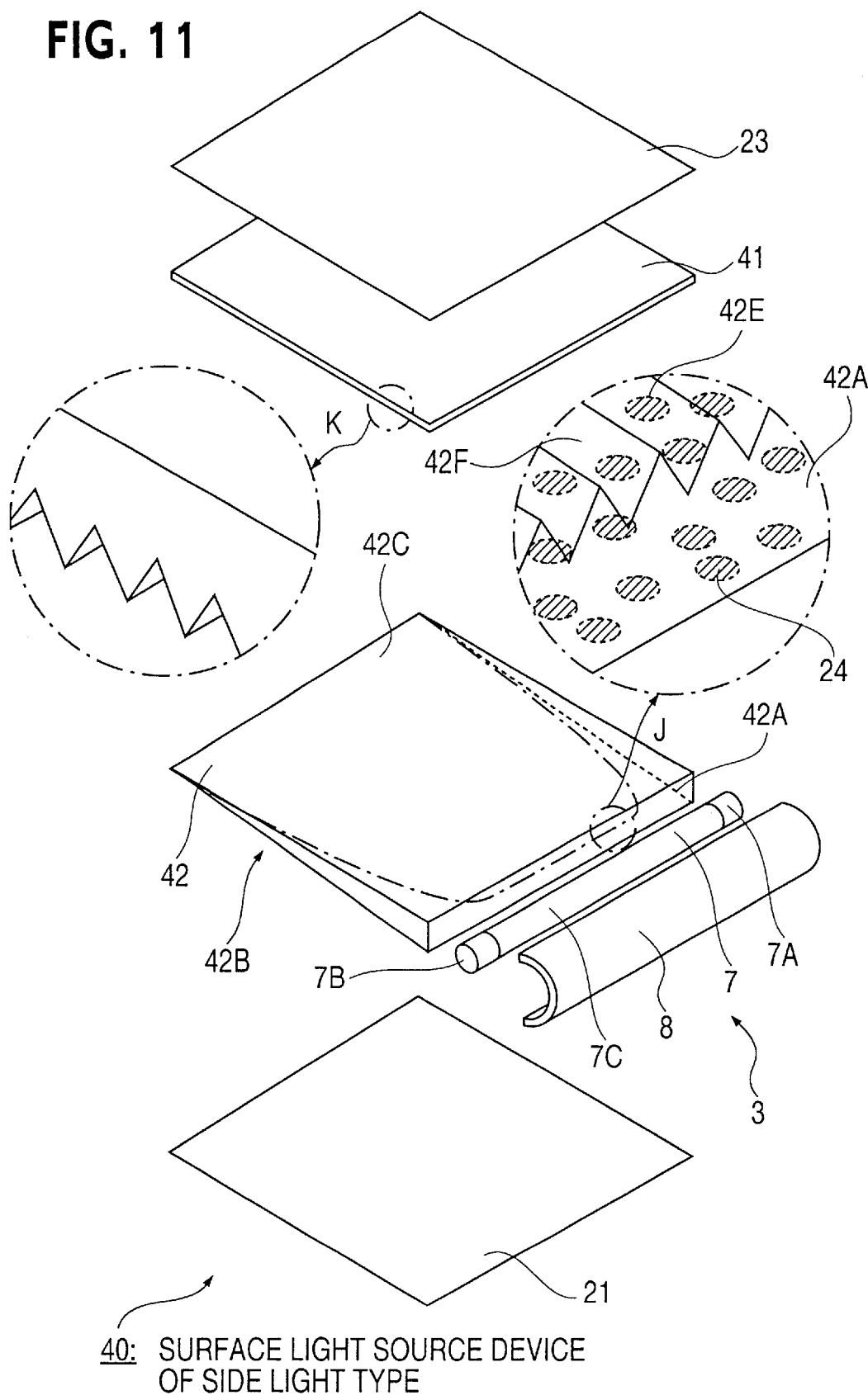
FIG. 11 is an exploded perspective view of the third embodiment.

FIG. 11 illustrates a third embodiment in the same manner as FIG. 1. This embodiment is characterized in that the surface light source device of side light type 40 uses a new guide plate 42. A liquid crystal panel is not depicted, but one may be provided to the outside of the light-scattering sheet 23 as in the first embodiment. Repeated description of parts which are identical to the first embodiment will be omitted and explanation will concentrate on the characteristic.

The surface light source device 40 comprises a guide plate 42, a primary light source 3, comprising a wedge-shaped light source element 7 and a reflector 8, a reflection sheet 21, a prism sheet 41 as a light control member, and a light-scattering sheet 23.

The prism sheet 41 is provided so that the prism surface is facing the emission surface 42C. This arrangement is selected so that the projections on the prism surface run generally parallel to the incidence surface 42A.

The guide plate 42 comprises a scattering guide body which is wedge-shaped in cross-section. The matrix comprises, for instance, polymethyl-methacrylate (PMMA) and a great number of light-permeable particles are uniformly dispersed therein. The particles have a different refractive index than the matrix.

The guide plate 42 comprises major surfaces 42B and 42C. The major surface 22C provides an emission surface, from which illuminating light is output. The other major surface 22B provides a back surface.

The emission surface 42C of the scattering guide plate 42 comprises a prism surface. As shown by the partial enlargement at reference mark J, this prism surface has slopes 42E and 42F. The prism surface corrects directivity of emitted light within a surface parallel to the incidence surface 42A. Correction of directivity of emitted light within a surface perpendicular to the incidence surface 42A is achieved by the prism sheet 41.

A scattering pattern 24, having the same arrangement as the first embodiment, is provided on the back surface 42B. And of course, the present embodiment achieves the same effects as the first embodiment.

(4) Fourth Embodiment

Figure 12:
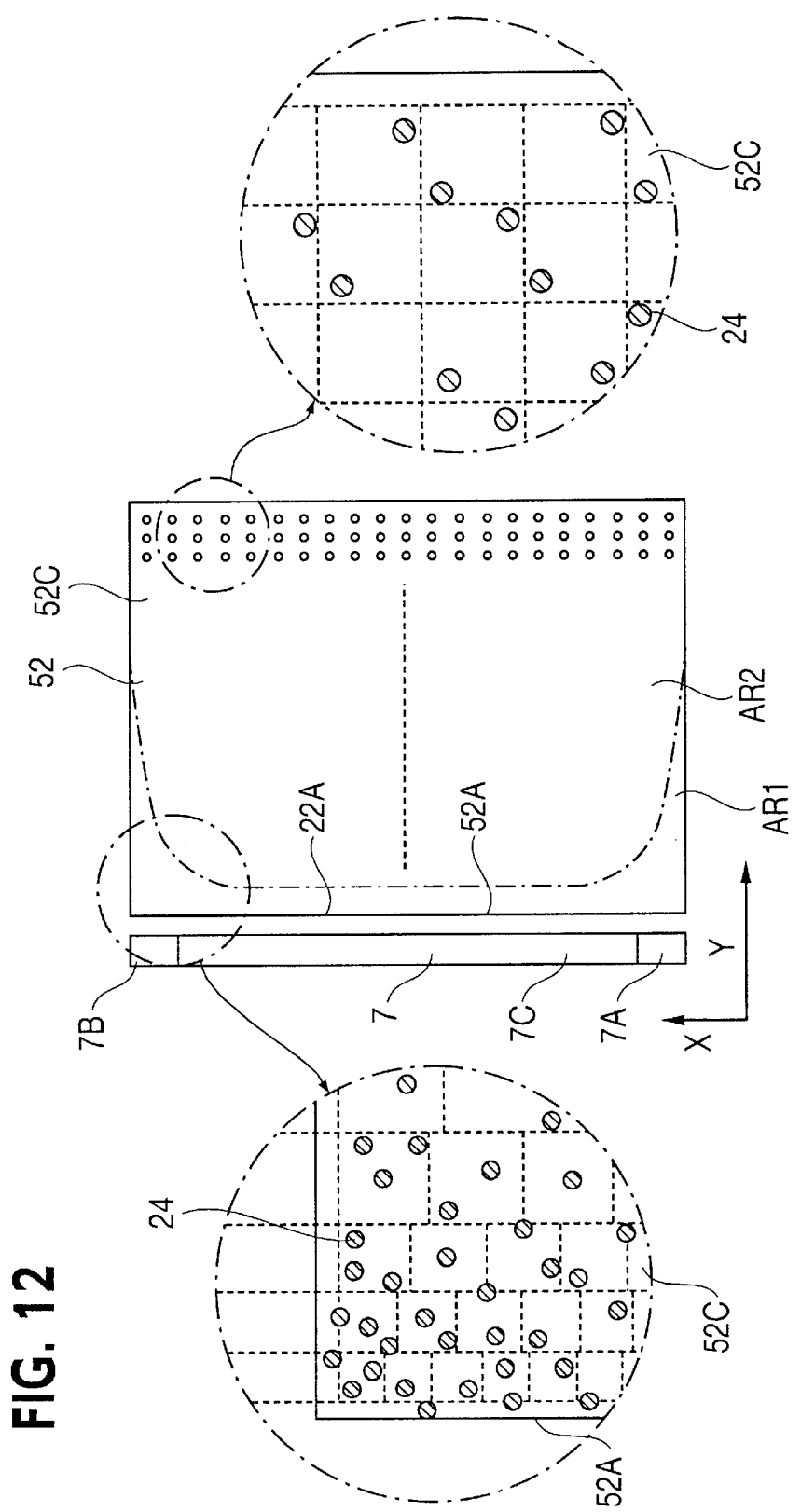
FIG. 12 is a plan view of a scattering guide plate used in the fourth embodiment.

FIG. 12 illustrates, in the same manner as FIG. 1 and FIG. 10, a scattering pattern arrangement in a scattering pattern guide plate used in a surface light source device of side light type according to the fourth embodiment. With the exception of the scattering pattern arrangement, the structure and functions of this embodiment are identical to first embodiment. Therefore, repetition will be omitted and the following explanation will concentrate on the scattering pattern.

The back surface of the scattering guide plate 52 comprises a prism surface identical to that of first embodiment. The prism surface comprises a great number of projections which run perpendicular to the incidence surface 52A, providing a light control surface (prism surface) which gathers illuminating light toward the frontal direction within a surface parallel the incidence surface 52A.

On the other hand, a scattering pattern 24 is randomly arranged on the emission surface 52C. The covering rate is given by the same distribution as the first embodiment. As shown in partial enlargement in the right-hand section of FIG. 12, the micro-dots are randomly arranged at a low density in the portion which is far from the incidence surface 52A. On the other hand, as shown in partial enlargement in the left-hand section of FIG. 12, the micro-dots are randomly arranged at a high density in the portions near to the incidence surface 52A, and especially the corners.

In actual design, for instance, dots from the grid-like arrangement with pitch P are arranged at positions which have been displaced using random numbers. Consequently, brightness reduction, which would be most noticeable in the corners, is prevented.

Since the dot arrangement of the present embodiment has extremely low regularity, it has a high power to prevent moaré streaks. There is a possibility that roughness in appearance may occur on the emission surface due to this irregular arrangement. However, this can be eased by adjusting density and size and the like of the scattering pattern.

(5) Fifth Embodiment

Figure 13:
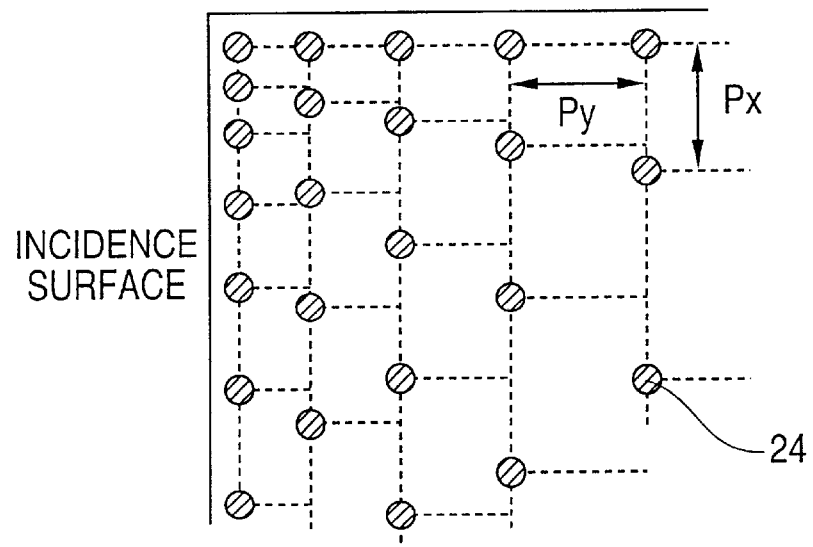
FIG. 13 is a detailed plan view of one portion of a scattering guide plate used in the fifth embodiment.

FIG. 13 is a diagram to explain a fifth embodiment in the same manner as FIG. 1. The characteristic of the fifth embodiment is the arrangement of the scattering pattern 24 provided on the back surface or the emission surface of the guide plate. The scattering pattern arrangement according to this characteristic can also be applied as a modification of the scattering pattern arrangement on the guide plate in any of the embodiments 1~4. Therefore, only the arrangement of this scattering pattern 24 will be explained.

According to the present embodiment, firstly, brightness distribution of a guide plate, which is provided with a scattering pattern 24 having a grid arrangement of constant pitch, is measured. The covering rate for all surfaces is set based on brightness distribution thus measured.

Vertical and horizontal pitches Px and Py are calculated to ensure that brightness is uniform on a center line which is perpendicular to the incidence surface 22A.

Furthermore, in regions which are far from the center line, at least one of pitches Px and Py is adjusted. Since brightness reduction occurs in the region AR1 (see FIG. 1) as described above, distribution of overall dot intensity is generally the same as in first embodiment. That is, the dots are arranged at large vertical and horizontal pitches Px and Py in regions which are far from the incidence surface. On the other hand, the dots are arranged at small vertical and horizontal pitches Px and Py in regions which are close to the incidence surface, especially at the corners. Note that, unlike the first embodiment, the grids do not satisfy conditions of squares. In other words, the vertical and horizontal pitched Px and Py may be independently adjusted in order to correct brightness distribution.

Furthermore, the same effects as the embodiments 1 to 4 can be obtained even when the scattering pattern is regular in compliance with the grid arrangement. Moreover, since irregularity is low in the present embodiment, roughness in appearance does not easily occur on the emission surface.

(6) Sixth Embodiment

Figure 14:
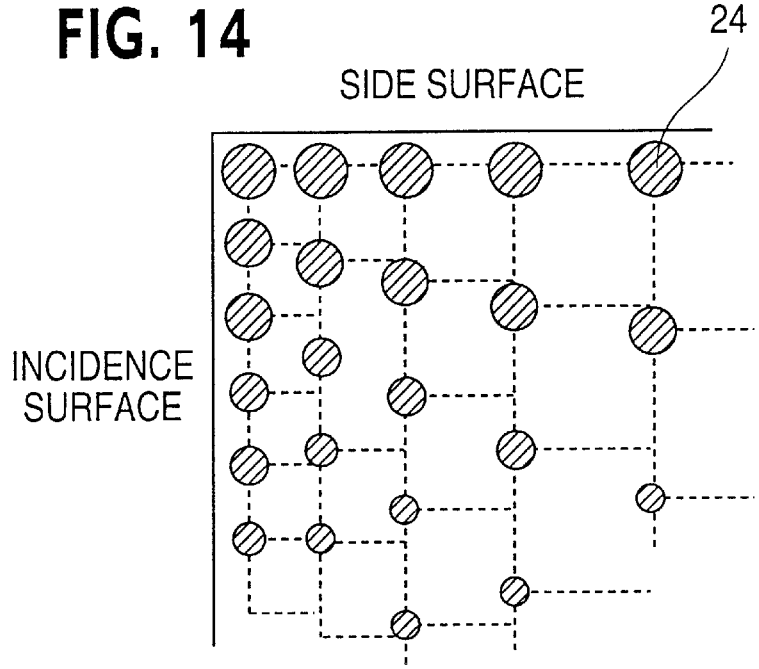
FIG. 14 is a detailed plan view of one portion of a scattering guide plate used in the sixth embodiment.

FIG. 14 is a diagram to explain the sixth embodiment in the same manner as FIG. 1. The characteristic of the present embodiment is the manner whereby the covering rate of the scattering pattern 24, provided on the back surface or the emission surface of the guide plate, is adjusted. Thus, the present embodiment corresponds to a modification of the fifth embodiment. Therefore, the scattering pattern arrangement in compliance with this characteristic can also be applied as a modification of the scattering pattern arrangement on the guide plate used in any of the embodiments 1 to 4. Only the scattering pattern 24 will be explained below.

According to the present embodiment, brightness distribution of the guide plate, which is provided with a scattering pattern 24 having a grid arrangement of constant pitch, is measured as in the fifth embodiment. The covering rate for all surfaces is set based on brightness distribution thus measured.

Next, vertical and horizontal pitches Px and Py, varying in accordance with the radius of each dot, are calculated to ensure that brightness is uniform on a center line which is perpendicular to the incidence surface 22A. In addition, combinations of Px, Py and dot radius are adjusted in regions which are far from the center line. For example, cover rate along the direction parallel to the incidence surface can be adjusted by adjusting dot radius; and, cover rate along a direction perpendicular to the incidence surface can be adjusted by adjusting Px and Py.

As already described, since brightness reduction occurs in the region AR1 (see FIG. 1), the distribution of the overall cover rate is generally the same as the first embodiment.

In regions which are far from the incidence surface, dot radius is small and vertical and horizontal pitches Px and Py are large. On the other hand, dot radius is large and vertical and horizontal pitches Px and Py are small near the incidence surface, especially in the corners. Since dot radius is added as a variable in the present embodiment, brightness compensation is possible over a wide range. That is, the present embodiment is effective in a case where there is considerable brightness reduction in the region AR1. The practical range of dot radius is, for instance, 80 $\mu$m~30 $\mu$m.

Furthermore, same effects as the embodiments 1 to 4 can be obtained even when the scattering pattern is regular in compliance with a grid arrangement. Moreover, since irregularity is low in the present embodiment, roughness does not easily occur on the emission surface.

(7) Seventh Embodiment

Figure 15:
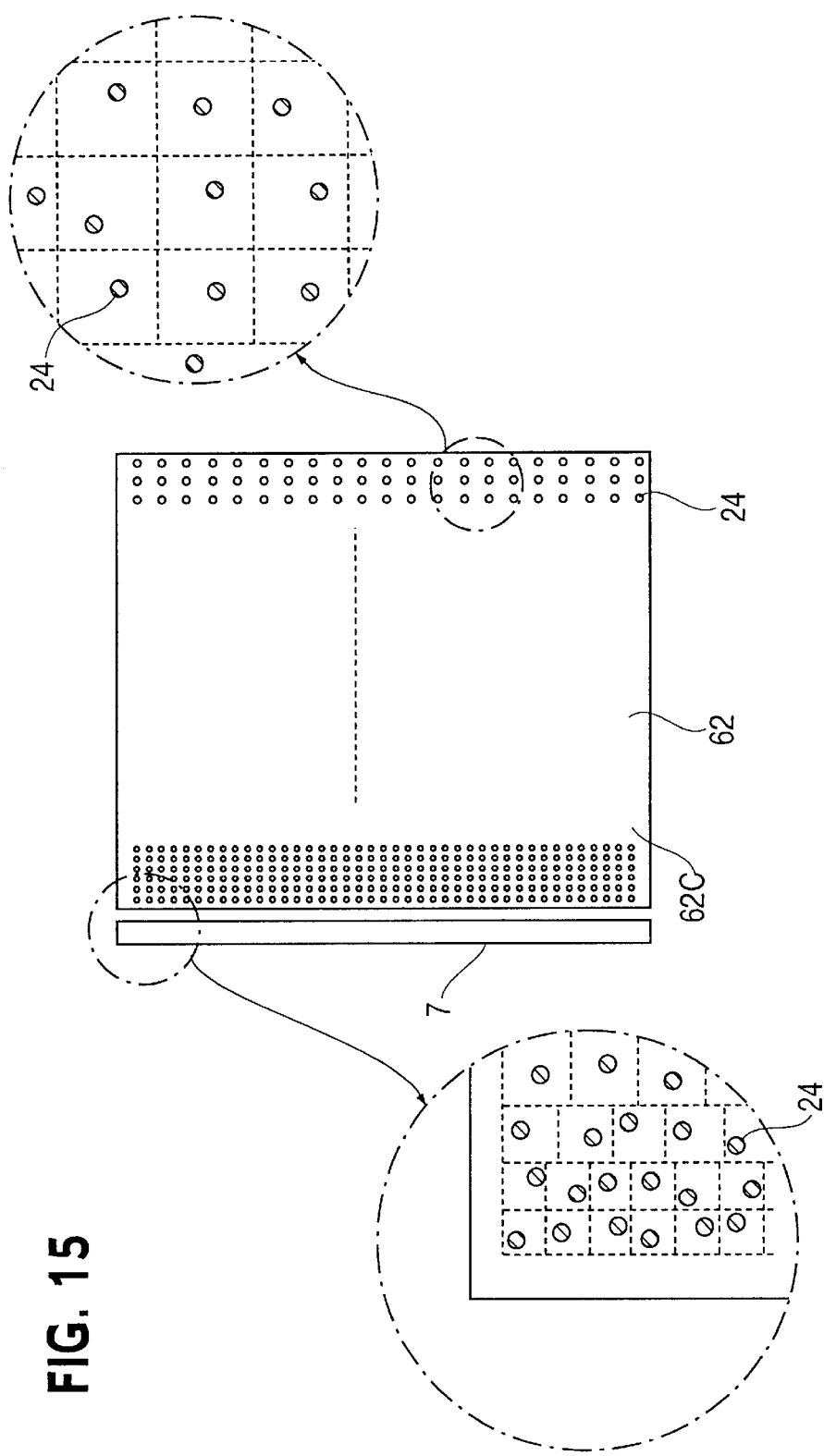
FIG. 15 is a plan view of a scattering guide plate used in the seventh embodiment.

FIG. 15 is a plan view of a scattering guide plate 62 according to a seventh embodiment, viewed from above the emission surface 62C. The scattering guide plate 62 may be provided instead of the scattering guide plate 22 in the arrangement (first embodiment) shown in FIG. 2. In such a case, a fluorescent lamp 7 which is slightly longer than the incidence surface (that is, longer than the distance between the two corners of the incidence surface) is used.

The scattering guide plate 62 has a prism surface provided on the back surface, as in the scattering guide plate 22 in the first embodiment. The scattering pattern 24 is randomly arranged on the emission surface 62C. Cover rate distribution is the same as the first embodiment.

Firstly, a square grid is set using a reference pitch ($P_0$ in FIG. 1). Next, the pitch of the square grid is adjusted to suit the required cover rate. Furthermore, a dot arrangement position in each square is determined by random numbers.

As a result, as shown in the partial enlargement in the right-hand section of FIG. 15, the scattering micro-dots are randomly arranged at a low density in the portions which are far from the incidence surface 62A. On the other hand, as shown in partial enlargement in the left-hand section of FIG. 15, the micro-dots are randomly arranged at a high density in the portions near to the incidence surface 62A, and especially the corners.

According to the present embodiment, since regularity of the dot arrangement is reduced, moaré streaks, which would be caused by a regular arrangement, can be effectively prevented.

(8) Eighth Embodiment

In the eighth embodiment, the scattering pattern is determined in consideration of a regular arrangement of color filters contained in a liquid crystal display panel (see reference mark LP in FIG. 2). That is, the dot arrangement is designed to prevent moaré streaks caused when the micro-dots strongly overlap with color filters of a specific color.

Figure 16:
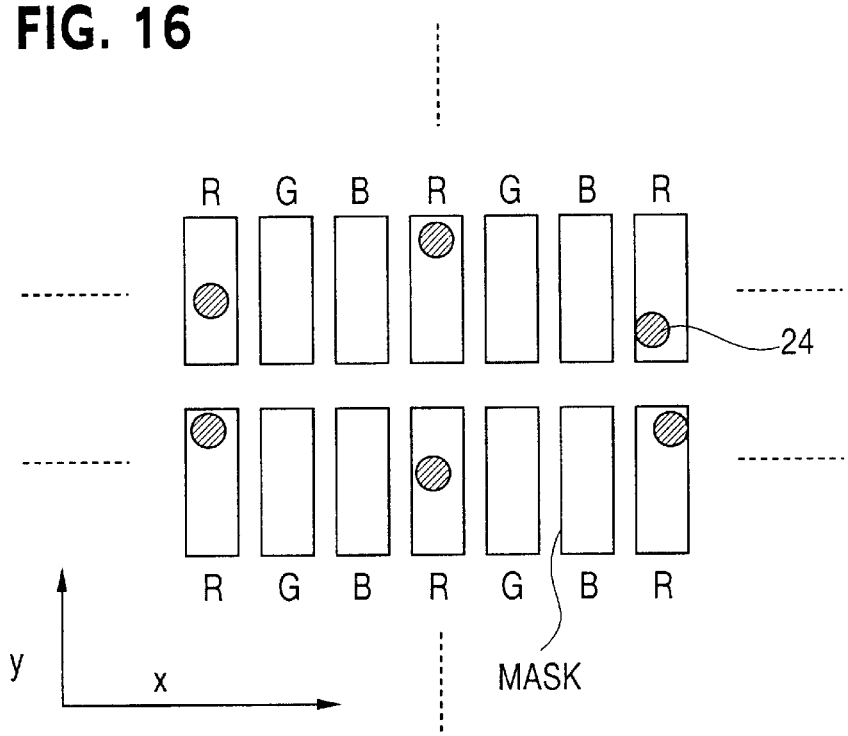
FIG. 16 is a plan view to explain moaré streaks caused by a color filter.

FIG. 16 is a diagram to explain how moaré streaks are caused by overlap with a color filter arrangement. As shown in FIG. 16, color filters of different colors are cyclically arranged in direction x, and color filters of the same color are repeatedly arranged in direction y. Reference marks R, G and B, respectively, represent red, green and blue color filters on a liquid crystal panel.

In this case, when a scattering pattern is provided in the same manner as the embodiments described above, a dot arrangement is obtained wherein one specific color (here, red color filter R) overlaps locally. This causes moaré streaks.

Figure 17:
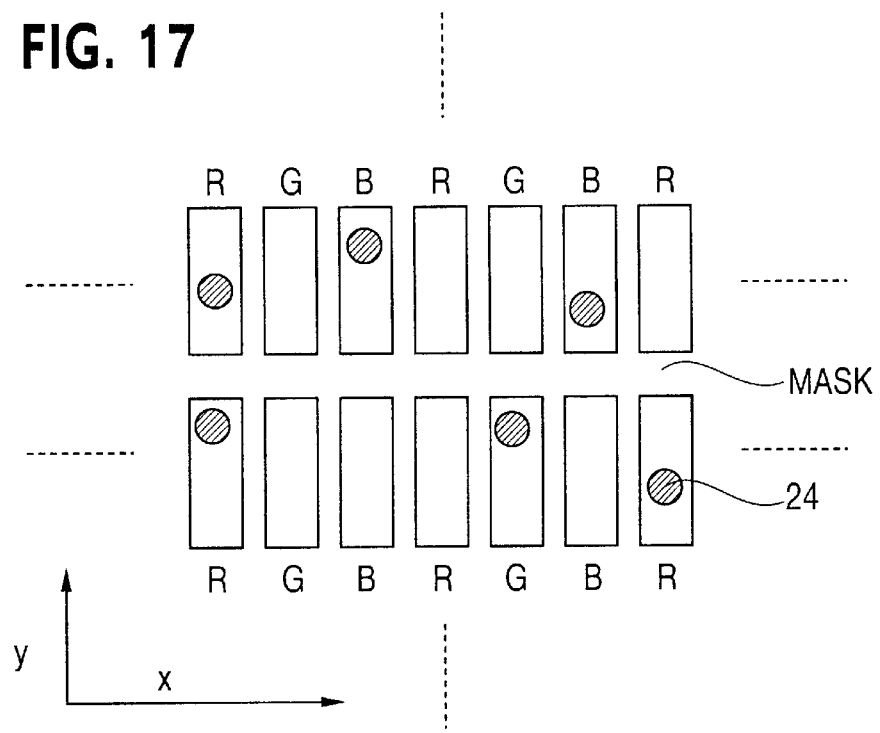
FIG. 17 is a plan view to explain a dot layout for preventing moaré streaks caused in connection with a color filter.

In order to avoid this, the dots are arranged as shown in FIG. 17. In FIG. 17, color filters of different colors are cyclically arranged in direction x, and color filters of the same color are repeatedly arranged in direction y.

Firstly, the extent of irregularity of the dot arrangement (scattering pattern 24) in direction x is increased to more than in direction y. Consequently, the dots are prevented from overlapping biasedly with color filters of a specific color, thereby preventing moaré streaks.

Here, it should be noted that direction reference mark x in FIG. 16 and FIG. 17 is unrelated to reference mark X (see for instance FIG. 1) which indicates the direction perpendicular to the incidence surface of the guide plate.

Figure 18:
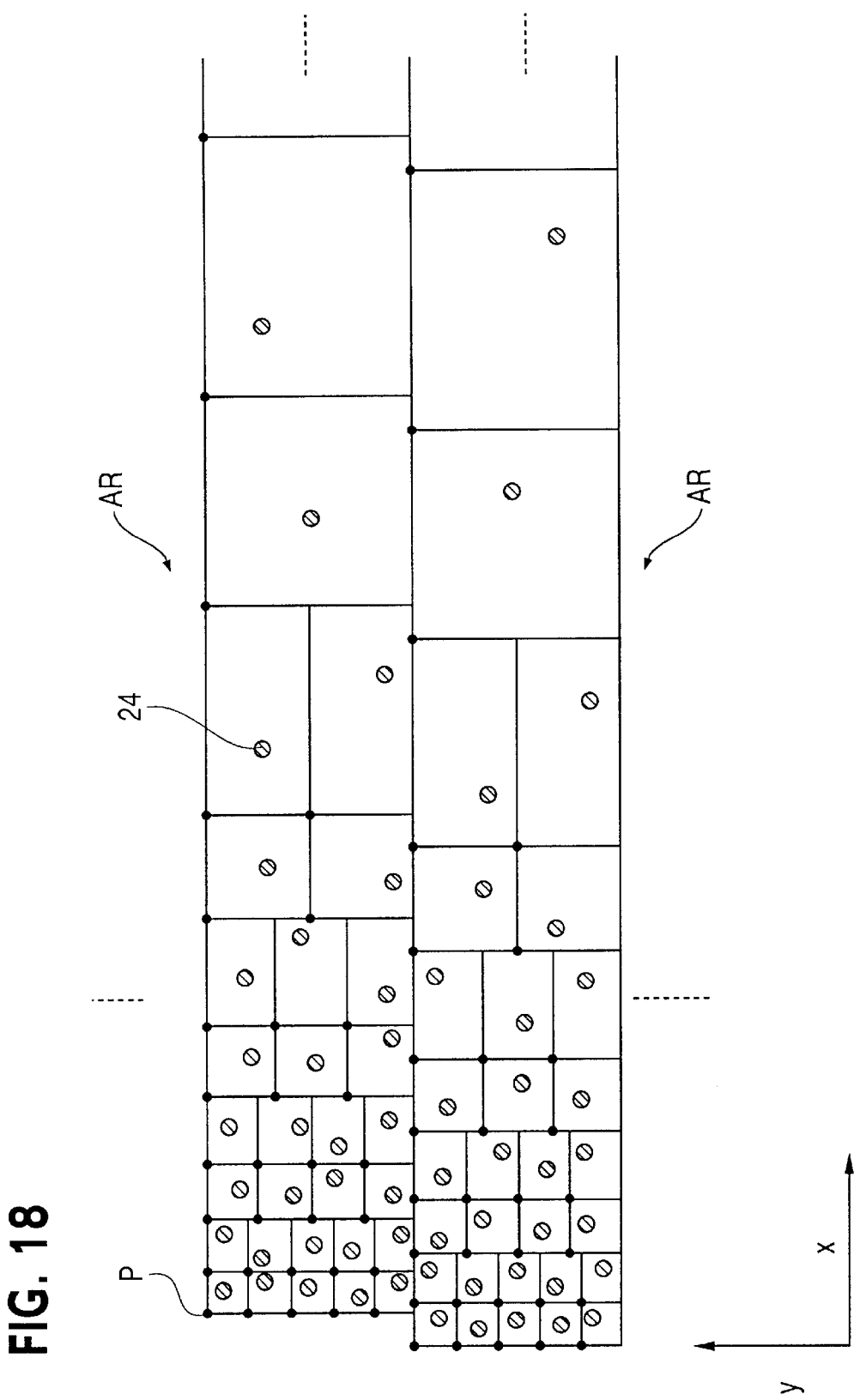
FIG. 18 is a plan view to explain a dot layout in the eighth embodiment.

The present embodiment provides a scattering pattern 24 having a dot arrangement as shown in FIG. 18. This arrangement is determined as follows.

1. The emission surface (or the back surface) is partitioned into many rectangular regions AR. The size of each region AR is adjusted in accordance with the covering rate required to ensure uniform brightness. The number of rectangles (grid elements) provided in the y direction and the length of the x direction sides is set so that the length of the x direction sides is never shorter than the length of the y direction side.

2. One dot 24 is provided in each rectangle. The dots are arranged randomly, using a specific point (reference mark P) on the grid surrounding the region AR1 as a reference.

The extent of irregularity of the direction x (cyclical arrangement of different color filters) is made greater than that of the direction y (repeated arrangement of same color filters). This stops the dot arrangement (scattering pattern 24) from becoming overlapped biasedly with a color filter of a specific color. As a result, moaré streaks are prevented.

Furthermore, this irregular dot arrangement 24 avoids regular overlapping with a frame-like mask, which is provided between the color filters. Therefore, moaré streaks arising from the relation with this mask arrangement are prevented.

(9) Other Modifications

The preferred embodiments described above are not intended to limit the scope of the present invention. For instance, modifications such as listed below are permissible.

(a) In the embodiments described above, the scattering pattern was provided with a higher density near the incidence surface. However, the present invention is not restricted to this.

Figure 19A:
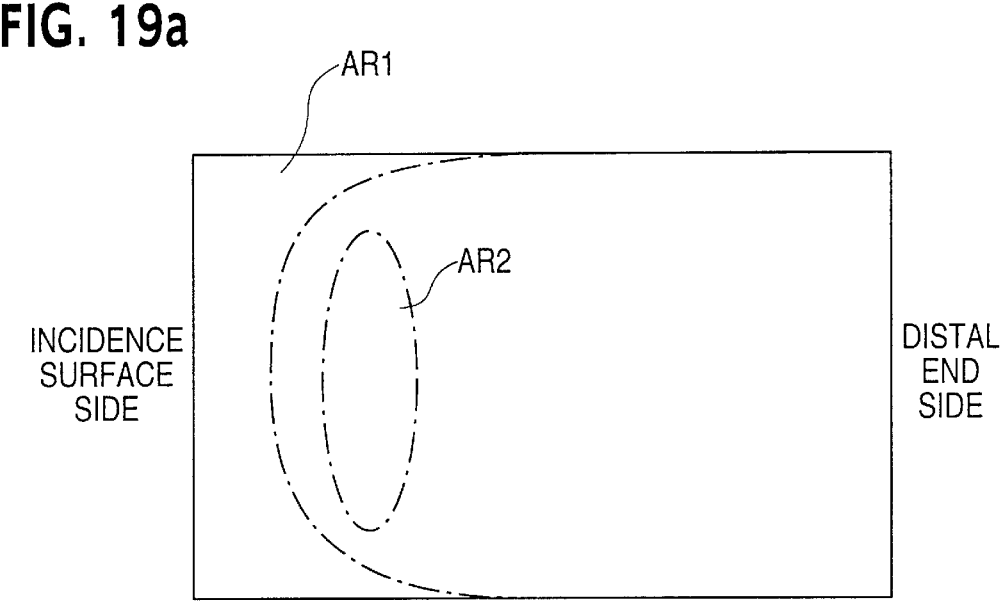
FIG. 19a, FIG. 19b and FIG. 19c are diagrams to explain change in cover rate of a scattering pattern in another embodiment.
Figure 19B:
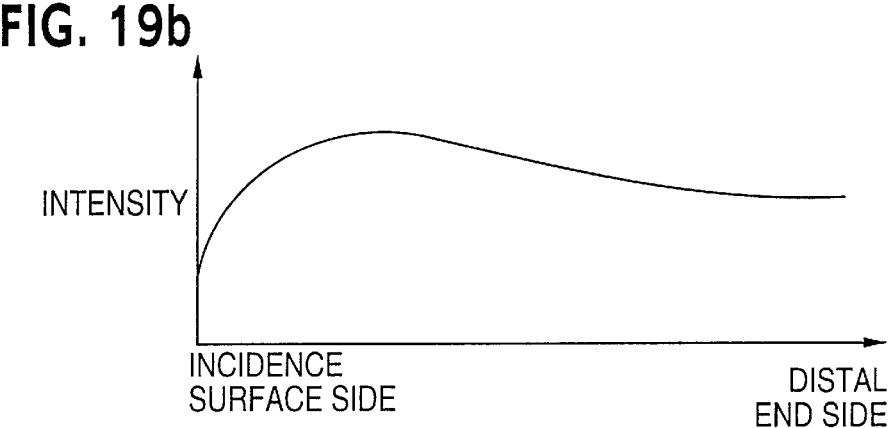
Figure 19C:
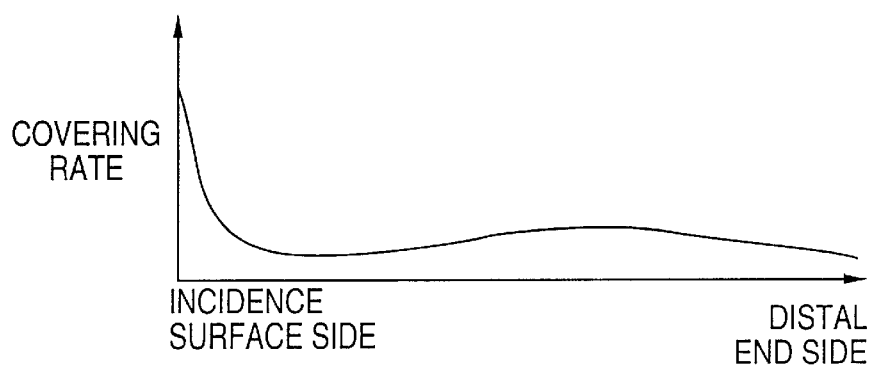

For instance, as shown in FIG. 19*a*, there is a case where the surface light source device of side light type forms a region AR1 of low brightness near the incidence surface and also a region AR2 of slightly higher brightness. FIG. 19*b* illustrates brightness shift along a center line. As shown in FIG. 19*c*, in such a case, the covering rate of the scattering pattern may be increased after first being decreased as distance from the incidence surface increases.

(b) In the third embodiment, the prism surface was formed on the emission surface of the guide plate, and the scattering pattern was formed on the back surface. However, the prism surface and the scattering pattern may both be formed on the emission surface of the guide plate.

(c) In the fourth embodiment, the scattering pattern was irregularly arranged on an emission surface having no prism surface. However, the scattering pattern may alternatively be provided on a back surface having no prism surface, or on an emission surface which has a prism surface.

(d) In the eighth embodiment, the grid was made long and narrow in accordance with the covering rate. Then, the scattering pattern was provided in an irregular arrangement inside the grid, preventing overlap between the scattering pattern and color filters of a specific color. However, such overlap may be avoided in other ways.

For instance, after the dots have been provided in a provisional irregular arrangement by the means explained in first embodiment, the distance between adjacent dots in this provisional arrangement is checked.

Then, at places where dots continuously overlap with color filters of a specific color, the positions of these dots are revised and the dots are rearranged. As a result, it is possible to prevent the scattering pattern from overlapping with color filters of a specific color.

(e) In the case of the eighth embodiment, color filters, provided repeatedly in directions x and y which intersect perpendicularly, were arranged cyclically only in the direction x. However, the present invention can also be applied when the color filters are cyclically arranged in both directions x and y.

In that case, by rearranging a provisional arrangement of dots using the repetition pitch of the color filters as a reference, it is possible to stop the scattering pattern from overlapping with color filters of a specific color.

(f) In all the embodiments described above, the typical dot radius value was 50 $\mu$m. However, as already mentioned, the dot radius in each embodiment is within a range of hardly visible sizes, a practical upper limit being generally 80 μm. Nevertheless, there are cases when dot radius can exceed 80 μm, such as when a light-scattering sheet 23 is provided.

(g) The individual dots which make up the scattering pattern were shown as circular. However, the present invention need not be restricted to this case. The scattering pattern can be formed from dots of various shapes. In such cases, dot size is determined within a range of hardly visible sizes. Typical dot size is circular and not greater than generally 80 μm.

(h) There are no particular restrictions for types of additional elements which may be provided along the emission surface. For instance, the prism sheet can be replaced by a prism body having equal flexibility thereto. The light-scattering sheet may be provided between the prism sheet and guide plate. The light-scattering sheet and the prism sheet may not be provided at all.

(i) A regular reflection member of a given material, or a diffussive reflection member comprising white PET or the like, may be used as the reflection sheet.

(j) In the embodiments described above, a scattering guide plate was employed as the guide plate. However, a light-permeable guide plate can be employed instead of this scattering guide plate. Furthermore, there are no restrictions on types of material or manufacturing of the scattering pattern guide plate.

(k) The guide plate may be of shapes other than wedge-shaped in cross-section. For instance, a guide plate of uniform thickness may be used.

(l) An incidence surface may be provided on two or more end surfaces of the guide plate. In correspondence therewith, multiple primary light sources may be provided.

(m) The primary light source may comprise a light source element other than a rod shaped light source such as a fluorescent lamp. For instance, an arrangement of multiple point sources of light, such as light-emitting diodes, may be used as the primary light source.

(n) The surface light source device of the present invention is applicable for uses other than back-lighting of a liquid crystal display device. For instance, the present invention can be widely applied in a variety of illumination equipment and displays.

What is claimed is:

1. A surface light source device of side light type, comprising a light guide plate having an emission surface and a back surface as major surfaces, a primary light source to supply light through an incidence surface which is provided by an end surface of said light guide plate, wherein said emission surface or said back surface provides a light control surface having a great number of projections running generally perpendicular to said incidence surface and is provided with a scattering pattern having a great number of hardly visible micro-dots having scattering power, a covering rate of the scattering pattern varying according to a distance from said incidence surface and a size of each of said micro-dots being no greater than 80 μm.

2. A surface light source device of side light type, comprising a light guide plate having an emission surface and a back surface as major surfaces, a primary light source to supply light through an incidence surface which is provided by an end surface of said light guide plate, wherein said emission surface or said back surface provides a light control surface having a great number of projections running generally perpendicular to said incidence surface and is provided with a scattering pattern having a great number of hardly visible micro-dots each having scattering power, a covering rate of the scattering pattern having a tendency to decrease according to a distance from said incidence surface and a size of each of said micro-dots being no greater than 80 μm.

3. A surface light source device of side light type, comprising a light guide plate having an emission surface and a back surface as major surfaces, a primary light source to supply light through an incidence surface which is provided by an end surface of said light guide plate, wherein said emission surface or said back surface provides a light control surface having a great number of projections running generally perpendicular to said incidence surface and is provided with a scattering pattern having a great number of hardly visible micro-dots having scattering power, a covering rate of the scattering pattern having a tendency to increase closer to corners of said incidence surface, and a size of each of said micro-dots being no greater than 80 μm.

4. A surface light source device of side light type, comprising a light guide plate having an emission surface and a back surface as major surfaces, a primary light source to supply light through an incidence surface which is provided by an end surface of said light guide plate, wherein said emission surface or said back surface provides a light control surface having a great number of projections running generally perpendicular to said incidence surface and is provided with a scattering pattern having a great number of hardly visible micro-dots having scattering power, a covering rate of the scattering pattern varying according to a distance from said incidence surface and each of said micro-dots being a local rough surface in said emission surface or said back surface.

5. A surface light source device of side light type, comprising a light guide plate having an emission surface and a back surface as major surfaces, a primary light source to supply light through an incidence surface which is provided by an end surface of said light guide plate, wherein said emission surface or said back surface provides a light control surface having a great number of projections running generally perpendicular to said incidence surface and is provided with a scattering pattern having a great number of hardly visible micro-dots having scattering power, a covering rate of the scattering pattern having a tendency to decrease according to a distance from said incidence surface, and each of said micro-dots being a local rough surface in said emission surface or said back surface.

6. A surface light source device of side light type, comprising a light guide plate having an emission surface and a back surface as major surfaces, a primary light source to supply light through an incidence surface, which is provided by an end surface of said light guide plate, wherein said emission surface or said back surface provides a light control surface having a great number of projections running generally perpendicular to said incidence surface and is provided with a scattering pattern having a great number of hardly visible micro-dots having scattering power, a covering rate of the scattering pattern having a tendency to increase closer to corners of said incidence surface, and each of said micro-dots being a local rough surface in said emission surface or said back surface.

7. A surface light source device of side light type according to claim 1, wherein said micro-dots are arranged so as to have an irregularity.

8. A surface light source device of side light type according to claim 1, wherein said micro-dots are arranged so as to have an irregularity, wherein degrees of the irregularity vary depending on directions.

9. A surface light source device of side light type according to claim 1, said surface light source device being used for lighting a liquid crystal display having a liquid crystal display panel provided with color filters, wherein said micro-dots are arranged so as to have an irregularity, wherein degrees of the irregularity depend on directions with correspondence to an arrangement direction of the color filters.

10. A surface light source device of side light type according to claim 1, said surface light source device being used for lighting a liquid crystal display having a liquid crystal display panel provided with color filters,
wherein said micro-dots are arranged with a local irregularity so as to avoid biased overlapping with the color filters for a particular color.

11. A surface light source device of side light type according to claim 1, wherein said micro-dots are arranged so as to have a regularity.

12. A liquid crystal display backlit by a surface light source device of side light type which comprises a light guide plate having an emission surface and a back surface as major surfaces, a primary light source to supply light through an incidence surface which is provided by an end surface of said light guide plate,
wherein said emission surface or said back surface provides a light control surface having a great number of projections running generally perpendicular to said incidence surface and is provided with a scattering pattern having a great number of hardly visible micro-dots having scattering power, a covering rate of the scattering pattern varying according to a distance from said incidence surface and a size of each of said micro-dots being no greater than 80 μm.

13. A liquid crystal display backlit by a surface light source device of side light type which comprises a light guide plate having an emission surface and a back surface as major surfaces, a primary light source to supply light through an incidence surface which is provided by an end surface of said light guide plate,
wherein said emission surface or said back surface provides a light control surface having a great number of projections running generally perpendicular to said incidence surface and is provided with a scattering pattern composed of a great number of hardly visible micro-dots having scattering power, a covering rate of the scattering pattern having a tendency to decrease according to a distance from said incidence surface, and a size of each of said micro-dots being greater than 80 μm.

14. A liquid crystal display backlit by a surface light source device of side light type which comprises a light guide plate having an emission surface and a back surface as major surfaces, a primary light source to supply light through an incidence surface which is provided by an end surface of said light guide plate, wherein said emission surface or said back surface provides a light control surface having a great number of projections running generally perpendicular to said incidence surface and is provided with a scattering pattern composed of a great number of hardly visible micro-dots having scattering power, a covering rate of the scattering pattern having a tendency to increase closer to corners of said incidence surface, and a size of each of said micro-dots being no greater than 80 μm.

15. A liquid crystal display backlit by a surface light source device of side light type which comprises a light guide plate having an emission surface and a back surface as major surfaces, a primary light source to supply light through an incidence surface which is provided by an end surface of said light guide plate, wherein said emission surface or said back surface provides a light control surface having a great number of projections running generally perpendicular to said incidence surface and is provided with a scattering pattern having a great number of hardly visible micro-dots having scattering power, a covering rate of the scattering pattern varying according to a distance from said incidence surface, and each of said micro-dots being a local rough surface in said emission surface or said back surface.

16. A liquid crystal display backlit by a surface light source device of side light type which comprises a light guide plate having an emission surface and a back surface as major surfaces, a primary light source to supply light through an incidence surface which is provided by an end surface of said light guide plate, wherein said emission surface or said back surface provides a light control surface having a great number of projections running generally perpendicular to said incidence surface and is provided with a scattering pattern having a great number of hardly visible micro-dots having scattering power, a covering rate of the scattering pattern having a tendency to decrease according to a distance from said incidence surface, and each of said micro-dots being a local rough surface in said emission surface or said back surface.

17. A liquid crystal display backlit by a surface light source device of side light type which comprises a light guide plate having an emission surface and a back surface as major surfaces, a primary light source to supply light through an incidence surface which is provided by an end surface of said light guide plate, wherein said emission surface or said back surface provides a light control surface having a great number of projections running generally perpendicular to said incidence surface and is provided with a scattering pattern having a great number of hardly visible micro-dots having scattering power, a covering rate of the scattering pattern having a tendency to increase closer to corners of said incidence surface, and each of said micro-dots being a local rough surface in said emission surface or said back surface.

18. A liquid crystal display according to claim 12, wherein said micro-dots are arranged so as to have an irregularity.

19. A liquid crystal display according to claim 12, wherein said micro-dots are arranged so as to have an irregularity, wherein degrees of the irregularity vary depending on directions.

20. A liquid crystal display according to claim 12, said surface light source device being used for lighting of a liquid crystal display having a liquid crystal display panel provided with color filters, wherein said micro-dots are arranged so as to have an irregularity degrees of which are different depending on directions with correspondence to an arrangement direction of the color filters.

21. A liquid crystal display according to claim 12, said surface light source device being used for lighting a liquid crystal display having a liquid crystal display panel provided with color filters, wherein said micro-dots are arranged with a local irregularity so as to avoid biased overlapping with color filters for a particular color.

22. A liquid crystal display according to claim 12, wherein said micro-dots are arranged so as to have a regularity.

23. A light guide plate, comprising a side end surface to introduce light and an emission surface and a back surface as major surfaces, said light being bent and emitted from said emission surface, wherein said emission surface or said back surface provides a light control surface having a great number of projections running generally perpendicular to said incidence surface and is provided with a scattering pattern having a great number of hardly visible micro-dots having scattering power, a covering rate of the scattering pattern varying according to a distance from said incidence surface, and a size of each of said micro-dots being no greater than 80 μm.

24. A light guide plate, comprising a side end surface to introduce light and an emission surface and a back surface as major surfaces, said light being bent and emitted from said emission surface, wherein said emission surface or said back surface provides a light control surface having a great number of projections running generally perpendicular to said incidence surface and is provided with a scattering pattern having a great number of hardly visible micro-dots having scattering power, a covering rate of the scattering pattern having a tendency to decrease according to a distance from said incidence surface, and a size of each of said micro-dots being no greater than 80 μm.

25. A light guide plate, comprising a side end surface to introduce light and an emission surface and a back surface as major surfaces, said light being bent and emitted from said emission surface, wherein said emission surface or said back surface provides a light control surface having a great number of projections running generally perpendicular to said incidence surface and is provided with a scattering pattern having a great number of hardly visible micro-dots having scattering power, a covering rate of the scattering pattern having a tendency to increase closer to corners of said incidence surface, and a size of each of said micro-dots being no greater than 80 μm.

26. A light guide plate, comprising a side end surface to introduce light and an emission surface and a back surface as major surfaces, said light being bent and emitted from said emission surface, wherein said emission surface or said back surface provides a light control surface having a great number of projections running generally perpendicular to said incidence surface and is provided with a scattering pattern having a great number of hardly visible micro-dots having scattering power, a covering rate of the scattering pattern varying according to a distance from said incidence surface, and each of said micro-dots being a local rough surface in said emission surface or said back surface.

27. A light guide plate, comprising a side end surface to introduce light and an emission surface and a back surface as major surfaces, said light being bent and emitted from said emission surface, wherein said emission surface or said back surface provides a light control surface having a great number of projections running generally perpendicular to said incidence surface and is provided with a scattering pattern having a great number of hardly visible micro-dots having scattering power, a covering rate of the scattering pattern having a tendency to decrease according to a distance from said incidence surface, and each of said micro-dots being a local rough surface in said emission surface or said back surface.

28. A light guide plate, comprising a side end surface to introduce light and an emission surface and a back surface as major surfaces, said light being bent and emitted from said emission surface,
wherein said emission surface or said back surface provides a light control surface having a great number of projections running generally perpendicular to said incidence surface and is provided with a scattering pattern having a great number of hardly visible micro-dots having scattering power, a covering rate of the scattering pattern having a tendency to increase closer to corners of said incidence surface, and each of said micro-dots being a local rough surface in said emission surface or said back surface.

29. A light guide plate according to claim 23, wherein said micro-dots are arranged so as to have an irregularity.

30. A light guide plate according to claim 23, wherein said micro-dots are arranged so as to have an irregularity, wherein degrees of the irregularity vary depending on directions.

31. A light guide plate according to claim 23, wherein said light guide plate is used in a surface light source device of side light type for lighting a liquid crystal display having a liquid crystal display panel provided with color filters, said micro-dots being arranged so as to have an irregularity degrees of which are different depending on directions with correspondence to an arrangement direction of the color filters.

32. A light guide plate according to claim 23, wherein said light guide plate being used in a surface light source device of side light type for lighting a liquid crystal display having a liquid crystal display panel provided with color filters, said micro-dots being arranged with a local irregularity so as to avoid biased overlapping with color filters for a particular color.

33. A light guide plate according to claim 23, wherein said micro-dots are arranged so as to have a regularity.

\* \* \* \* \*

UNITED STATES PATENT AND TRADEMARK OFFICE
CERTIFICATE OF CORRECTION

PATENT NO.    : 6,412,968 B1
DATED         : July 2, 2002
INVENTOR(S)   : Shingo Ohkawa It is certified that error appears in the above-identified patent and that said Letters Patent is hereby corrected as shown below:

<u>Title page,</u>
Item [73], Assignee, change "Saitama" to -- Kawaguchi -- and insert
-- Yasuhiro Koike, Yokohama --.
Item [57], ABSTRACT, insert the substitute ABSTRACT submitted by Amendment dated May 12, 2000.

<u>Column 1,</u>
Line 26, change "plate" to -- plates --.

<u>Column 3,</u>
Line 31, insert -- ( -- before "prism".
Line 54, insert -- the -- after "in".

<u>Column 7,</u>
Line 57, delete ")".

Signed and Sealed this

Fifteenth Day of April, 2003

JAMES E. ROGAN
*Director of the United States Patent and Trademark Office*